(12) United States Patent
Blevins et al.

(10) Patent No.: US 9,158,295 B2
(45) Date of Patent: Oct. 13, 2015

(54) MULTI-STAGE PROCESS MODELING METHOD

(75) Inventors: Terrence L. Blevins, Round Rock, TX (US); Wilhelm K. Wojsznis, Austin, TX (US); Christopher J. Worek, Austin, TX (US); Mark Nixon, Round Rock, TX (US)

(73) Assignee: FISHER-ROSEMOUNT SYSTEMS, INC., Round Rock, TX (US)

( * ) Notice: Subject to any disclaimer, the term of this patent is extended or adjusted under 35 U.S.C. 154(b) by 1050 days.

(21) Appl. No.: 13/113,044

(22) Filed: May 21, 2011

(65) Prior Publication Data

US 2011/0288837 A1 Nov. 24, 2011

Related U.S. Application Data

(60) Provisional application No. 61/347,244, filed on May 21, 2010.

(51) Int. Cl.
*G06G 7/48* (2006.01)
*G05B 17/02* (2006.01)

(52) U.S. Cl.
CPC ...... *G05B 17/02* (2013.01); *G05B 2219/31265* (2013.01); *G05B 2219/32077* (2013.01)

(58) Field of Classification Search
USPC .......................................................... 703/6
See application file for complete search history.

(56) References Cited

U.S. PATENT DOCUMENTS

| 6,885,907 | B1 | 4/2005 | Zhang et al. |
| 7,461,040 | B1 | 12/2008 | Goldman et al. |
| 7,523,384 | B2* | 4/2009 | Wold ............................ 714/799 |
| 7,966,149 | B2 | 6/2011 | Samardzija et al. |
| 2003/0041042 | A1* | 2/2003 | Cohen et al. ..................... 706/45 |
| 2005/0268197 | A1 | 12/2005 | Wold |

(Continued)

FOREIGN PATENT DOCUMENTS

| CN | 101529355 A | 9/2009 |
| CN | 101535910 A | 9/2009 |

(Continued)

OTHER PUBLICATIONS

Blevins et al., "When Batch Processing is Critical to Your Operations, Imagine the Worth of Knowing the Predicted Value of Quality Parameters," ControlGlobal.com (May 2008). Retrieved from the Internet on Jul. 14, 2011: URL:http://www.controlglobal.com/articles/2008/164.html?page=print.

(Continued)

*Primary Examiner* — Saif Alhija
(74) *Attorney, Agent, or Firm* — Marshall, Gerstein & Borun LLP

(57) ABSTRACT

A process is modeled by resolving the process into a plurality of process stages, including at least a first process stage and a second process stage, and developing a plurality of models, each model corresponding to a respective one of the plurality of process stages, wherein the model corresponding to each process stage is developed using data from one or more runs of that process stage and output quality data relating to the one or more runs of that process stage and wherein the model corresponding to each process stage is adapted to produce an output quality prediction associated with that process stage, and wherein the output quality prediction produced by the model of a first one of the process stages is used to develop the model of a second one of the process stages.

53 Claims, 13 Drawing Sheets

(56) References Cited

U.S. PATENT DOCUMENTS

| 2008/0103747 | A1 | 5/2008 | Macharia et al. |
| 2009/0143873 | A1 | 6/2009 | Navratil et al. |
| 2009/0287320 | A1 | 11/2009 | MacGregor et al. |
| 2010/0057237 | A1 | 3/2010 | Kettaneh et al. |

FOREIGN PATENT DOCUMENTS

| JP | 2002108412 A | 4/2002 |
| JP | 2007188473 A | 7/2007 |
| JP | 2009087342 A | 4/2009 |
| WO | WO-2007/018868 A1 | 2/2007 |
| WO | WO-2010/030524 A2 | 3/2010 |

OTHER PUBLICATIONS

Cinar et al., "Batch Fermentation—Modeling, Monitoring, and Control," Marcel Dekker, pp. 315-353 (2003).
Jørgensen et al., "On-Line Batch Fermentation Process Monitoring (NIR)—Introducing 'Biological Process Time'," *Journal of Chemometrics*, 18:81-91 (2004).
Kassidas et al., "Synchronization of Batch Trajectories Using Dynamic Time Warping," *AIChE Journal*, 44(4):864-875 (Apr. 1998).
Kohonen et al., "Multi-Block Methods in Multivariate Process Control," *Journal of Chemometrics*, 22:281-287 (2008).
Lee et al., "Enhanced Process Monitoring of Fed-Batch Penicillin Cultivation Using Time-Varying and Multivariate Statistical Analysis," *Journal of Biotechnology*, 110:119-136 (2004).
Lefrancois et al., "Tools for Online Analytics," Emerson Exchange Workshop (2008).
Marruchella et al., "Benefits Achieved Using Online Analytics in a Batch Manufacturing Facility," Presentation at the WBF Make2Profit Conference, Austin, Texas, pp. 1-13 (May 2010).
Mason et al., "Multivariate Statistical Process Control with Industrial Application," ASA-SIAM Series on Statistics and Applied Probability (2002). Table of Contents only.
McMillan et al., "PAT Tools for Accelerated Process Development and Improvement," *BioProcess International*, 6(S1):34-42 (Mar. 2008).
Moro et al., "Integrating SAP® Software into DeltaV," Emerson Exchange Workshop, pp. 1-49 (2008).
Nomikos et al., "Multi-Way Partial Least Squares in Monitoring Batch Processes," *Chemometrics and Intelligent Laboratory Systems*, 30:97-108 (1995).
Qin, "Statistical Process Monitoring: Basis and Beyond," *Journal of Chemometrics*, 17:480-502 (Sep. 2003).
Reiss et al., "Partial Least Squares Confidence Interval Calculation for Industrial End-of-Batch Quality Prediction," *Chemometrics and Intelligent Laboratory Systems*, 100(2):75-82 (2010).
U.S. Food and Drug Administration, Office of Pharmaceutical Science: URL:http://www.fda.gov/Cder/OPS/PAT.htm.
Westerhuis et al., "Analysis of Multiblock and Hierarchical PCA and PLS Models," *Journal of Chemometrics*, 12:301-321 (1998).
Wojewodka et al., "Benefits Achieved Using On-Line Data Analytics," Emerson Exchange Workshop, pp. 1-35 (2009).
Wojewodka et al., "Coupling Process Control Systems and Process Analytics to Improve Batch Operations," Emerson Exchange Workshop, pp. 1-36 (2007).
Wojewodka et al., "Data Analytics in Batch Operations," *Control* (2008).
Wojewodka et al., "Process Analytic in Depth," Emerson Exchange Short Course, pp. 1-80 (2008).
Wojewodka et al., "The Application of Data Analytics in Batch Operations," Emerson Exchange Short Course, pp. 1-33 (2008).
Zhang, "Multivariate Statistical Process Control," New Directions in Bioprocess Modeling and Control, Chapter 8, pp. 247-286, Boudreau et al., ISA, Research Triangle Park (2006).
International Preliminary Report on Patentability for Application No. PCT/US2011/037480, dated Nov. 27, 2012.
Search Report for Application No. GB1107729.4, dated Nov. 25, 2011.
International Search Report and Written Opinion for Application No. PCT/US2011/037480, dated Nov. 16, 2011.
Office Action in CN Application No. 201180025148.5 dated Jan. 12, 2015.
Notice of Reasons for Rejection for JP2013-511408 dated Mar. 16, 2015, 12 pages.

\* cited by examiner

MULTI-STAGE PROCESS MODELING METHOD

RELATED APPLICATIONS

This application claims the benefit under 35 U.S.C. §119 (e) of U.S. Provisional Patent Application, Ser. No. 61/347,244, entitled "Multi-Stage Process Modeling Method," filed May 21, 2010, the entire disclosure of which is hereby expressly incorporated by reference herein.

FIELD OF THE DISCLOSURE

This patent relates generally to process control system modeling and, more particularly, to methods of modeling a batch or continuous process resolved into a plurality of process stages.

BACKGROUND

Process control systems, like those used in chemical, petroleum or other processes, typically include one or more process controllers and input/output (I/O) devices communicatively coupled to at least one host or operator workstation and to one or more field devices via analog, digital or combined analog/digital buses. The field devices, which may be, for example, valves, valve positioners, switches and transmitters (e.g., temperature, pressure and flow rate sensors), perform process control functions within the process such as opening or closing valves and measuring process control parameters. The process controllers receive signals indicative of process measurements made by the field devices, process this information to implement a control routine, and generate control signals that are sent over the buses or other communication lines to the field devices to control the operation of the process. In this manner, the process controllers may execute and coordinate control strategies using the field devices via the buses and/or other communication links.

Process information from the field devices and the controllers may be made available to one or more applications (i.e., software routines, programs, etc.) executed by the operator workstation (e.g., a processor-based system) to enable an operator to perform desired functions with respect to the process, such as viewing the current state of the process (e.g., via a graphical user interface), evaluating the process, modifying the operation of the process (e.g., via a visual object diagram), etc. Many process control systems also include one or more application stations (e.g., workstations) which are typically implemented using a personal computer, laptop, or the like and which are communicatively coupled to the controllers, operator workstations, and other systems within the process control system via a local area network (LAN). Each application station may include a graphical user interface that displays the process control information including values of process variables, values of quality parameters associated with the process, process fault detection information, and/or process status information.

Typically, displaying process information in the graphical user interface is limited to the display of a value of each process variable associated with the process. Additionally, some process control systems may characterize simple relationships between some process variables to determine quality metrics associated with the process. However, in cases where a resultant product of the process does not conform to predefined quality control metrics, the process and/other process variables can only be analyzed after the completion of a batch, a process, and/or an assembly of the resulting product. While viewing the process and/or quality variables upon the completion of the process enables improvements to be implemented to the manufacturing or the processing of subsequent products, these improvements are not able to remediate the current completed products, which are out-of-spec.

This problem is particularly acute in batch processes, that is, in batch process control systems that implement batch processes. As is known, batch processes typically operate to process a common set of raw materials together as a "batch" through various numbers of stages or steps, to produce a product. Multiple stages or steps of a batch process may be performed in the same equipment, such as in a tank, while others of the stages or steps may be performed in other equipment. Because the same raw materials are being processed differently over time in the different stages or steps of the batch process, in many cases within a common piece of equipment, it is difficult to accurately determine, during any stage or step of the batch process, whether the material within the batch is being processed in a manner that will likely result in the production of the end product that has desired or sufficient quality metrics. That is, because the temperature, pressure, consistency, pH, or other parameters of the materials being processed changes over time during the operation of the batch, many times while the material remains in the same location, it is difficult to determine whether the batch processes is operating at any particular time during the batch run in a manner that is this likely to produce an end product with the desired quality metrics.

One known method of determining whether a currently operating batch is progressing normally or within desired specifications (and is thus likely to result in a final product having desired quality metrics) compares various process variable measurements made during the operation of the on-going batch with similar measurements taken during the operation of a "golden batch." In this case, a golden batch is a predetermined, previously run batch selected as a batch run that represents the normal or expected operation of the batch and that results in an end product with desired quality metrics. However, batch runs of a process typically vary in temporal length, i.e., vary in the time that it takes to complete the batch, making it difficult to know which time, within the golden batch, is most applicable to the currently measured parameters of the on-going batch. Moreover, in many cases, batch process variables can vary widely during the batch operation, as compared to those of a selected golden batch, without a significant degradation in quality of the final product. As a result, it is often difficult, if not practically impossible, to identify a particular batch run that is capable of being used in all cases as the golden batch to which all other batch runs should be compared.

A method of analyzing the results of on-going batch processes that overcomes one of the problems of using a golden batch involves creating a statistical model for the batch. This technique involves collecting data for each of a set of process variables (batch parameters) from a number of different batch runs of a batch process and identifying or measuring quality metrics for each of those batch runs. Thereafter, the collected batch parameters and quality data is used to create a statistical model of the batch, with the statistical model representing the "normal" operation of the batch that results in desired quality metrics. This statistical model of the batch can then be used to analyze how different process variable measurements made during a particular batch run statistically relate to the same measurements within the batch runs used to develop the model. For example, this statistical model may be used to provide an average or a median value of each measured process variable, and a standard deviation associated with each measured process variable at any particular time during the batch run to which the currently measured process variables can be compared. Moreover, this statistical model, may be used to predict how the current state of the batch will effect or relate to the ultimate quality of the batch product produced at the end of the batch.

Generally speaking, this type of batch modeling requires huge amounts of data to be collected from various sources such as transmitters, control loops, analyzers, virtual sensors, calculation blocks and manual entries. Most of the data is stored in continuous data historians. However, significant amounts of data and, in particular, manual entries, are usually associated with process management systems. Data extraction from both of these types of systems must be merged to satisfy model building requirements. Moreover, as noted above, a batch process normally undergoes several significantly different stages, steps or phases, from a technology and modeling standpoint. Therefore, a batch process is typically sub-divided with respect to the phases, and a model may be constructed for each phase. In this case, data for the same phase or stage, from many batch runs, is grouped to develop the statistical model for that phase or stage. The purpose of such a data arrangement is to remove or alleviate process non-linearities. Another reason to develop separate batch models on a stage, phase or other basis is that, at various different stages of a batch, different process parameters are active and are used for modeling. As a result, a stage model can be constructed with a specific set of parameters relevant for each particular stage to accommodate or take into account only the process parameters relevant at each batch stage. For example at a certain stage, additives may be added to the main batch load, and process parameters pertaining to those additives do not need to be considered in any preceding batch stage, but are relevant to the batch stage at which the additives are added.

However in creating this statistical batch model, it is still necessary to deal with the fact that different batch runs typically span different lengths of time. This phenomena is based on a number of factors such as, for example, different wait times associated with operators taking manual actions within the batch runs, different ambient conditions that require longer or shorter heating or other processing times, variations in raw material compositions that lead to longer or shorter processing times during a batch run, etc. In fact, it is normal that the data trend for a particular process variable spans a different length of time in different batch runs, and therefore that common batch landmarks in the different batch process runs have time shifted locations with respect to one another. To create a valid statistical model, however, the data for each stage, operation, or phase of a batch must be aligned with comparable data from the same stage, operation or phase of the other batches used to create the model. Thus, prior to using data measured during runs of a batch process to create a statistical model for use in modeling and analyzing the batch process, it is necessary to align the batch data from the different batch runs to a common time frame. Techniques for performing such alignment of batch data are disclosed in U.S. patent application Ser. No. 12/784,689, entitled "On-Line Alignment Of A Process Analytical Model With Actual Batch Operation," filed May 21, 2010, the disclosure of which is hereby incorporated by reference as if fully set forth herein. Once aligned, the batch data may be used in conjunction with analytic tools such as principal component analysis (PCA) and projection to latent structures (PLS) to develop models of the batch process that may be used to model and analyze further runs of the batch process.

The on-line use of analytic tools such as PCA and PLS techniques for fault detection and prediction of quality parameters has, in many instances, been limited to continuous processes in which a single product is produced. In such instances, the process is often treated as a single unit with a fixed set of measurements and lab analysis. For these types of processes, a single PCA or PLS model may be developed and applied in an on-line environment. However, to address the requirements of continuous or batch processes in which multiple products are produced using one or more pieces of plant equipment, each having its own set of instrumentation and quality parameters, a more general approach must be taken in developing a model off-line and in thereafter applying on-line analytics.

Applying on-line analytic tools to continuous and batch processes involves several challenges. First, in a batch operating environment, a product may be produced using numerous pieces of equipment that may be run in series, in parallel, or in a hybrid configuration having some equipment run in series and some in parallel. The equipment used in manufacturing and the associated process operating conditions depend on the product that is manufactured. Different lab and field measurements may be used at various points in the manufacturing process for one way of manufacturing a product versus another, or for manufacturing different products, which complicates model development. Similarly, a continuous operating environment also may involve multiple major pieces of equipment arranged in different configurations. The processing associated with each piece of equipment, and associated process measurements and control, in some cases, may vary as processing conditions change with throughput or with the product that is being processed.

Thus, tools designed to support on-line analytics for process modeling must take account of the product being produced, the equipment arrangements that may be used to make the product, and the different operating conditions and associated field and lab measurement needed to manufacture the product. Prior modeling approaches employed a single aggregate model for a process which did not allow for changing operating conditions and associated field and lab measurements needed in connection with modeling processes employing multiple pieces of equipment or producing multiple different products.

SUMMARY

Modeling a batch or continuous manufacturing process may be facilitated by dividing the process into the different stages of manufacturing required to produce a specific product. In this context, a manufacturing "stage" may be characterized by the type of equipment required for processing, the field and lab measurement required to monitor or control the process, the process operating conditions that must be maintained, and the impact on the final product being produced. The concept of a stage may be applied in the development and application of on-line analytics to both continuous and batch process. Once the different stages associated with a product have been defined, analytic models may be constructed on a stage-by-stage basis. The effort needed to develop analytic models may be less since the off-line analytic tools used for model development may be designed to automatically leverage off the stage definition to extract data from an on-line data historian. The on-line analytics application may be developed to automatically select the appropriate PCA and PLS model for on-line use based on the stage of processing being modeled. As a result, stage models can be flexibly configured to accommodate changing manufacturing configuration.

A method of modeling a process implemented by a process control system comprises resolving the process into a plurality of process stages, said plurality of process stages including at least a first process stage and a second process stage and developing a plurality of models, each corresponding to a respective one of the plurality of process stages. The plurality of models include at least a model of the first process stage and a model of the second process stage, and the model corresponding to each process stage is developed using data from one or more runs of that process stage and output quality data relating to the one or more runs of that process stage. In addition, the model corresponding to each process stage is adapted to produce an output quality prediction associated with that process stage, and the output quality prediction produced by the model of the first process stage is used to develop the model of the second process stage.

The output quality data relating to the one or more runs of a process stage may comprise end-of-stage product quality or end-of-batch product quality. The model corresponding to each process stage may be adapted to produce an output quality prediction comprising a prediction of either end-of-stage product quality or end-of-batch product quality.

Developing a plurality of models corresponding to the plurality of process stages of a batch process comprises gathering data during each of a plurality of runs of the process to produce a plurality of batches, including measuring values for each of a plurality of process variables during each process stage of each run of the process.

The modeling data for a process stage of a batch process form (are) a three-dimensional array of data, including a plurality of values measured at a plurality of time periods for each of a plurality of variables during the process stage for each of a plurality of batches, and the three-dimensional array of data may be unfolded into a two-dimensional array of data comprising values of the process variables for a plurality of batches at each of a plurality of times during the plurality of process stages. Thus, the three-dimensional array may be dimensioned by variables, time, and plurality of batches.

Information derived by the model of the first process stage of a batch process and used by the second process stage of the batch process may comprise a quality prediction for a batch produced by the batch process and may be used as initial conditions for the model of the second process stage. A forgetting factor (i.e., filtering) may be applied to at least a portion of the information derived by the model of the first process stage and used by the model of the second process stage.

When modeling a continuous process, developing a plurality of models corresponding to the plurality of process stages of the continuous process may comprise gathering data during each of a plurality of time periods during implementation of the process, and gathering data may include measuring values for each of a plurality of process variables during each time period. The values measured for a process stage of a continuous process may comprise a three-dimensional array of data including a plurality of values measured for each of a plurality of variables during the process stage for each of a plurality of time periods during implementation of the process, and the three-dimensional array of data may be unfolded into a two-dimensional array of data comprising values of the process variables at each of a plurality of times periods during implementation of the continuous process. Developing a plurality of models may comprise constructing a projection to latent structures or PLS model of a process stage.

A batch process implemented with (or operated by) a process control system may be analyzed by resolving the process into a plurality of process stages, including at least a first process stage and a second process stage, and developing a plurality of models, each model corresponding to a respective one of the plurality of process stages, said plurality of models including at least a model of the first process stage and a model of the second process stage. The model of the second process stage uses information derived by the model of the first process stage, and the plurality of models is then used to predict a value of a parameter of the process.

In one embodiment, a process having a first process stage and a second process stage may be modeled by developing a model of the first process stage using a training data set corresponding to a plurality of runs of the process, applying at least a first portion of the training data set as input to the model of the first process stage to produce an output quality prediction for the first process stage, and developing a model of the second process stage using at least a second portion of the training data set and the output quality prediction for the first process stage. The model of the first process stage may further produce an indication of reliability of the output quality prediction for the first process stage, and the indication of reliability of the output quality prediction for the first process stage may be used for developing the model of the second process stage. Preferably, a model is developed for each process stage, at least a portion of the training data set is applied as input to the model of each process stage to produce an output quality prediction for that process stage, and at least a portion of the training data set and the output quality prediction of the preceding process stage are applied as input to the model of each process stage following the first process stage.

Such a model may be used by applying to the model of the first process stage a first set of data obtained from a first run the multi-stage process to produce an output quality prediction for the first process stage and applying to the model of the second process stage a second set of data obtained from a second run of the multi-stage process and the output quality prediction for the first process stage.

DETAILED DESCRIPTION

Figure 1:
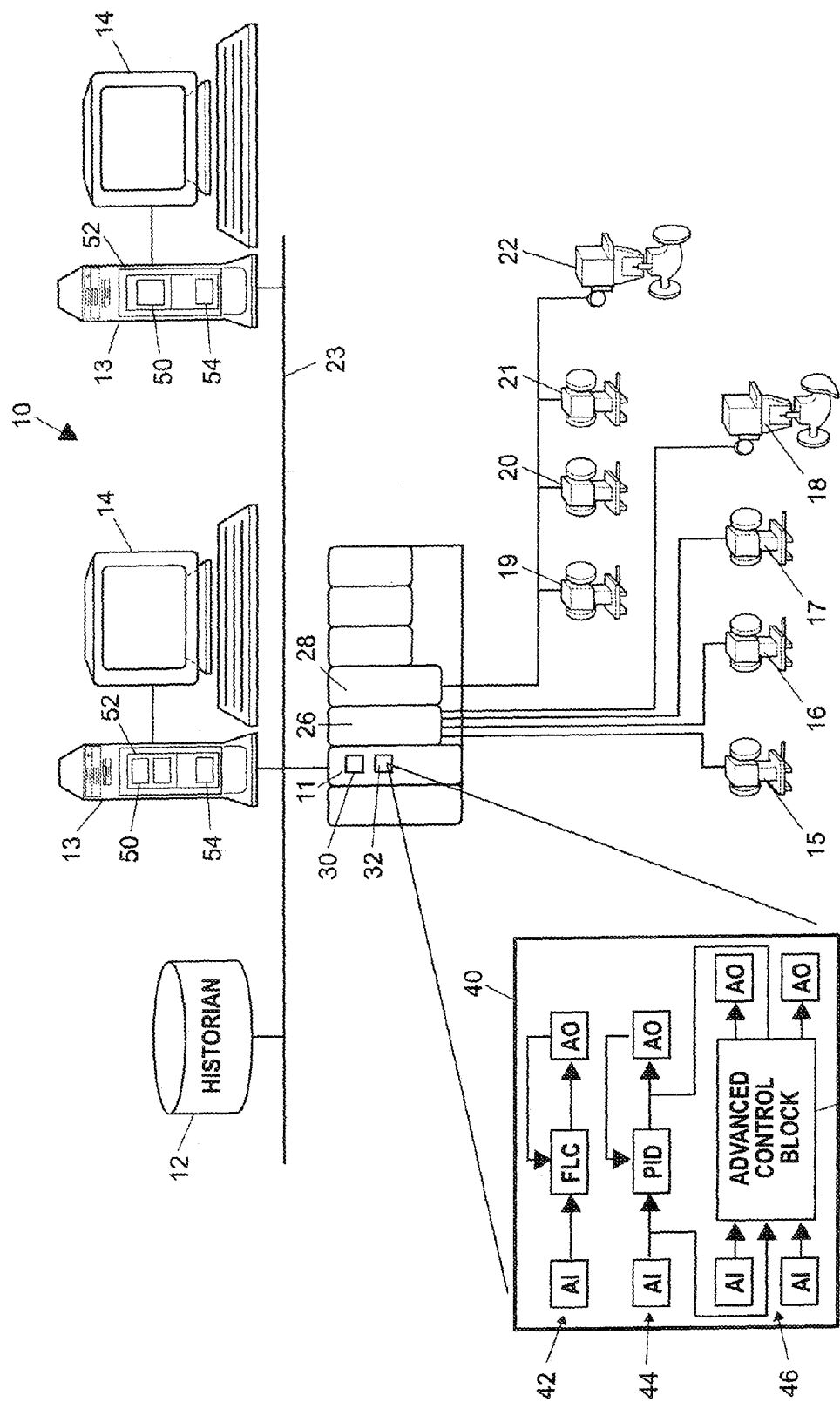
FIG. 1 is a diagram of a process control network having a controller and field devices that may be used to implement batch processes.

FIG. 1 illustrates an example process control system 10 including a process controller 11 connected to a data historian 12 and to one or more host workstations or computers 13 (which may be any type of personal computers, workstations, etc.), each having a display screen 14. The controller 11 is also connected to field devices 15-22 via input/output (I/O) cards 26 and 28 and may operate to implement one or more batch runs of a batch process using the field devices 15-22. The data historian 12 may be any desired type of data collection unit having any desired type of memory and any desired or known software, hardware or firmware for storing data. The data historian 12 may be separate from (as illustrated in FIG. 1) or a part of one of the workstations 13. The controller 11, which may be, by way of example, the DeltaV® controller sold by Emerson Process Management, is communicatively connected to the host computers 13 and to the data historian 12 via, for example, an Ethernet connection or any other desired communication network 23. The controller 11 is also communicatively connected to the field devices 15-22 using any desired hardware and software associated with, for example, standard 4-20 ma devices and/or any smart communication protocol such as the FOUNDATION® Fieldbus protocol, the HART® protocol, the WirelessHART™ protocol, etc.

The field devices 15-22 may be any types of devices, such as sensors, valves, transmitters, positioners, etc., while the I/O cards 26 and 28 may be any types of I/O devices conforming to any desired communication or controller protocol. In the embodiment illustrated in FIG. 1, the field devices 15-18 are standard 4-20 ma devices or HART devices that communicate over analog lines or combined analog and digital lines to the I/O card 26, while the field devices 19-22 are smart devices, such as FOUNDATION® Fieldbus field devices, that communicate over a digital bus to the I/O card 28 using a Fieldbus communications protocol. Of course, the field devices 15-22 could conform to any other desired standard(s) or protocols, including any standards or protocols developed in the future.

The controller 11 includes a processor 30 that implements or oversees one or more process control routines (stored in a memory 32), which may include control loops, and communicates with the devices 15-22, the host computers 13 and the data historian 12 to control a process in any desired manner. It should be noted that any control routines or modules described herein may have parts thereof implemented or executed by different controllers or other devices if so desired. Likewise, the control routines or modules described herein which are to be implemented within the process control system 10 may take any form, including software, firmware, hardware, etc. Control routines may be implemented in any desired software format, such as using object oriented programming, using ladder logic, sequential function charts, function block diagrams, or using any other software programming language or design paradigm. Likewise, the control routines may be hard-coded into, for example, one or more EPROMs, EEPROMs, application specific integrated circuits (ASICs), or any other hardware or firmware elements. Thus, the controller 11 may be configured to implement a control strategy or control routine in any desired manner.

In some embodiments, the controller 11 implements a control strategy using what are commonly referred to as function blocks, wherein each function block is an object or other part (e.g., a subroutine) of an overall control routine and operates in conjunction with other function blocks (via communications called links) to implement process control loops within the process control system 10. Function blocks typically perform one of an input function, such as that associated with a transmitter, a sensor or other process parameter measurement device, a control function, such as that associated with a control routine that performs PID, fuzzy logic, etc. control, or an output function which controls the operation of some device, such as a valve, to perform some physical function within the process control system 10. Of course, hybrid and other types of function blocks exist. Function blocks may be stored in and executed by the controller 11, which is typically the case when these function blocks are used for, or are associated with standard 4-20 ma devices and some types of smart field devices such as HART devices, or may be stored in and implemented by the field devices themselves, which can be the case with Fieldbus devices.

As illustrated by the exploded block 40 of FIG. 1, the controller 11 may include a number of single-loop control routines, illustrated as routines 42 and 44, and, if desired, may implement one or more advanced control loops, such as multiple/input-multiple/output control routines, illustrated as control loop 46. Each such loop is typically referred to as a control module. The single-loop control routines 42 and 44 are illustrated as performing single loop control using a single-input/single-output fuzzy logic control block and a single-input/single-output PID control block, respectively, connected to appropriate analog input (AI) and analog output (AO) function blocks, which may be associated with process control devices such as valves, with measurement devices such as temperature and pressure transmitters, or with any other device within the process control system 10. The advanced control loop 46 is illustrated as including inputs communicatively connected to one or more AI function blocks and outputs communicatively connected to one or more AO function blocks, although the inputs and outputs of an advanced control block 48 may be connected to any other desired function blocks or control elements to receive other types of inputs and to provide other types of control outputs. The advanced control block 48 may be any type of model predictive control (MPC) block, neural network modeling or control block, a multi-variable fuzzy logic control block, a real-time-optimizer block, etc. or may be an adaptively tuned control block, etc. It will be understood that the function blocks illustrated in FIG. 1, including the advanced control block 48, can be executed by the controller 11 or, alternatively, can be located in and executed by any other processing device, such as one of the workstations 13 or even one of the field devices 19-22.

Moreover, as illustrated in FIG. 1, one or more process analysis routines 50 may be stored and executed by various devices of the process control system 10. While process analysis routines 50 are illustrated as being stored in one or more computer readable memories 52 to be executed on processors 54 of the workstations 13, the routines 50 could be stored in and executed in other devices instead. Each process analysis routine 50 is communicatively coupled to one or more control routines such as the control routines 42, 44, 46, and/or to the data historian 12 to receive one or more measured process variable measurements. Each process analysis routine 50 may be used to develop a statistical process model and to analyze an on-going or on-line batch process based on that model. The analysis routines 50 may also display information to users, such as batch operators, regarding the on-line or on-going batch, as being implemented by the process control system 10.

Figure 2:
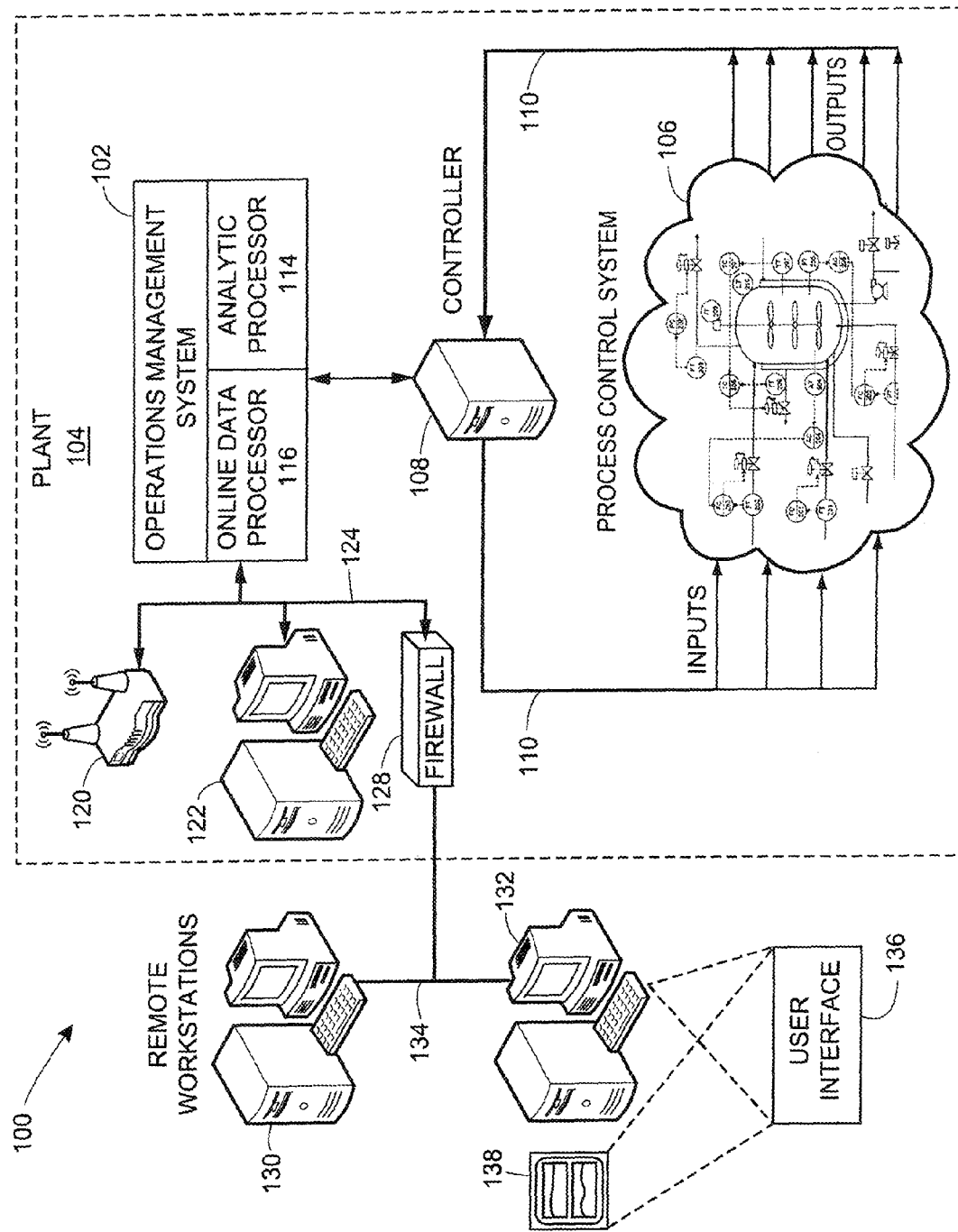
FIG. 2 is a block diagram illustrating an example process control system including an example operations management system that may implement an on-line batch analysis system for analyzing batch processes.

FIG. 2 is a block diagram illustrating a further example of a process control environment 100 including an operations management system (OMS) 102, also referred to as a Process Monitoring and Quality Prediction System (PMS), which can be used to implement an on-line batch process modeling and analysis system. The OMS 102 is located within a plant 104 that includes a process control system 106, which may include portions of or all of, for example, the process control network 10 of FIG. 1. The example plant 104 may be any type of manufacturing facility, process facility, automation facility, and/or any other type of process control structure or system. In some examples, the plant 104 may include multiple facilities located at different locations, and although the plant 104 of FIG. 2 is illustrated as including a single process control system 106, the plant 104 may include additional process control systems.

The process control system 106, which is communicatively coupled to a controller 108 via a data bus 110 and which is a part of that system, may include any number of field devices (e.g., input and/or output devices) for implementing process functions such as performing physical functions within the process or taking measurements of process variables. The field devices may include any type of process control component that is capable of receiving inputs, generating outputs, and/or controlling a process. For example, the field devices may include input devices such as, for example, valves, pumps, fans, heaters, coolers, and/or mixers to control a process. Additionally, the field devices may include output devices such as, for example, thermometers, pressure gauges, concentration gauges, fluid level meters, flow meters, and/or vapor sensors to measure process variables within or portions of a process. The input devices may receive instructions from the controller 108 to execute one or more specified commands and cause a change to the process. Furthermore, the output devices measure process data, environmental data, and/or input device data and transmit the measured data to the controller 108 as process control information. This process control information may include the values of variables (e.g., measured process variables and/or measured quality variables) corresponding to a measured output from each field device.

In the illustrated example of FIG. 2, the controller 108 may communicate with the field devices within the process control system 106 via the data bus 110, which may be coupled to intermediate communication components within the process control system 106. These communication components may include field junction boxes to communicatively couple field devices in a command area to the data bus 110. Additionally, the communication components may include marshalling cabinets to organize the communication paths to the field devices and/or field junction boxes. Furthermore, the communication components may include I/O cards to receive data from the field devices and convert the data into a communication medium capable of being received by the example controller 108. These I/O cards may convert data from the controller 108 into a data format capable of being processed by the corresponding field devices. In one example, the data bus 110 may be implemented using the Fieldbus protocol or other types of wired and/or wireless communication protocols (e.g., Profibus protocol, HART protocol, etc.).

The controller 108 of FIG. 2 (which could be a PC or any other type of controller) manages one or more control routines to manage the field devices within the process control system 106. The control routines may include process monitoring applications, alarm management applications, process trending and/or history applications, batch processing and/or campaign management applications, statistical applications, streaming video applications, advanced control applications, etc. Furthermore, the controller 108 may forward process control information to the OMS 102. The control routines may be implemented to ensure that the process control system 106 produces specified quantities of a desired product within a certain quality threshold. For example, the process control system 106 may be configured as a batch system that produces a product at a conclusion of a batch. In other examples, the process control system 106 may include a continuous process manufacturing system.

The process control information from the controller 108 may include values corresponding to measured process and/or quality variables that originate in the field devices within the process control system 106. In other examples, the OMS 102 may parse values within the process control information into the corresponding variables. The measured process variables may be associated with process control information originating from field devices that measure portions of the process and/or characteristics of the field devices. The measured quality variables may be associated with process control information related to measuring characteristics of the process that are associated with at least a portion of a completed product.

For example, the process may perform a chemical reaction in a tank that produces a concentration of a chemical in a fluid. In this example, the concentration of the chemical in the fluid may be a quality variable. A temperature of the fluid and a rate of fluid flow into the tank may be process variables. The OMS 102, via process control modeling and/or monitoring, may determine that the concentration of the fluid in the tank depends on the temperature of the fluid in the tank and the fluid flow rate into the tank. (note: was too much the same) In other words, the measured process variables contribute to or affect the quality of the measured quality variable. The OMS 102 may use statistical processing to determine the amount of influence and/or contribution each process variable has on a quality variable.

Additionally, the OMS 102 may model and/or determine relationships between the measured process variables and/or quality variables associated with the process control system 106. These relationships between the measured process and/or quality variables make possible create one or more calculated quality variables. A calculated quality variable may be a multivariate and/or linear algebraic combination of one or more measured process variables, measured quality variables, and/or other calculated quality variables. Furthermore, the OMS 102 may determine an overall quality variable from a combination of the measured process variables, measured quality variables, and/or calculated quality variables. The overall quality variable may correspond to a quality determination of the entire process and/or may correspond to a predicted quality of a resulting product of the process.

As illustrated in FIG. 2, the OMS 102 includes an analytic processor 114 that utilizes descriptive modeling, predictive modeling, and/or optimization to generate feedback regarding the status and/or quality of the process control system 106. The analytic processor 114 may detect, identify, and/or diagnose process operation faults and predict the impact of any faults on quality variables and/or an overall quality variable associated with a quality of a resultant product of the process control system 106. Furthermore, the analytic processor 114 may monitor the quality of the process operation by statistically and/or logically combining quality and/or process variables into an overall quality variable associated with the overall quality of the process. The analytic processor 114 may then compare the values calculated for the overall quality variable and/or values associated with the other quality variables to respective thresholds. These thresholds may be based on the predetermined quality limits of the overall quality variable at different times within the process. For example, if an overall quality variable associated with a process exceeds a threshold for an amount of time, the predicted final quality of the resulting product may not meet quality metrics associated with the finished product.

If the overall quality variable and/or any other quality variables deviate from the respective thresholds, the analytic processor 114 may generate a fault indication within a process overview chart and/or a process variation graph that shows an explained and/or an unexplained variation (or variance) associated with the overall quality variable and/or may show a variable that generated the process fault. The example analytic processor 114 manages the analysis to determine a cause of one or more process faults by providing functionality that enables an operator to generate process quality graphs (e.g., combination graphs, microcharts, process variation graphs, variable trend graphs, graphics, etc.) that may display current and/or past values of measured process variables, measured quality variables, and/or calculated quality variables, etc. Furthermore, in some cases, the analytic processor 114 generates these graphs while the process is operating and continually updates and/or re-calculates multivariate statistics associated with each of the graphs as additional process control information is received by the OMS 102.

To perform these functions for batch processes, the OMS 102 collects batch process data for a number of different process variables for each of a number of different batch runs. This data may be collected from the controller 108 or the field devices within the control network 110, from a data historian (e.g., the historian 12 of FIG. 1) that may have already collected and stored process data for different batch runs of the process, or from any other data source. The OMS 102 then processes this data to generate one or more statistical batch models, and stores the statistical batch models in, for example, a memory, such as a computer readable memory of the OMS 102 or in one of the memories 52 of the workstations 13 of FIG. 1. The statistical batch models can then be retrieved as needed to analyze ongoing or on-line batch runs in the future. In particular, the OMS 102 may use the stored batch models to analyze or to enable a user to analyze data collected during the on-line or on-going operation of a particular batch run.

However, to analyze the data from a batch run while the batch is operating on-line, the OMS 102 must first determine the exact stage at which the on-line batch is operating with respect to the batch model. That is, the OMS 102 must determine what point of the batch model to compare to the on-line batch data to be able to determine other factors about the on-line batch, such as whether any of the parameters of the on-line batch are abnormal or out of specification with respect to those same parameters within the batch model, whether the output of the on-line batch will meet desired quality metrics, etc. In fact, any analysis of the on-line data that uses the statistical batch model must first determine the point within the statistical batch model that is most applicable to the on-line data. It is only after the on-line data is aligned with the statistical batch model that further analyses can be performed, such providing an operator with screens to illustrate how the on-line batch compares to the batch model, performing statistical analyses to determine whether the batch is operating normally or within bounds or whether the batch is operating abnormally and/or whether the output of the batch is predicted to meet desired quality metrics, such as desired consistency, concentrations, etc.

As one example, once the data for the current on-line batch is aligned to a particular point within the batch model, the analytic processor 114 of the OMS 102 may provided a series of different graphs or other displays to the user to enable the user to determine the current operational stage or viability of the on-line batch run. Some of these graphs or displays are discussed below, it being understood that other displays, analyses or information may also or alternatively be provided to a user, such as an operator, maintenance personnel, etc.

As one example, the analytic processor 114 may generate a contribution graph by calculating contributions of process variables and/or quality variables to the overall quality variable, or to the multivariate statistical fault indicators of modeled and un-modeled process variations. The contributions of the process and/or quality variables may be displayed as a modeled and/or an unmodeled variation of each variable as a contribution to the variation associated with the overall quality and/or the quality variable associated with the fault.

Furthermore, the analytic processor 114 may generate variable trend graphs for any of the selected process and/or quality variables, jointly with a defined threshold. The variable trend graph may show values associated with the variable over a time of the process in relation to values of the variable during similar times in previous processes, e.g., the model variable values. By generating the contribution graph and/or the variable trend graphs, the analytic process 114 may also identify possible corrections to the process to mediate the detected fault in batch process. The variable trend graph may assist an operator to determine a cause of a process fault by providing an overlay of historical plots of data of the batches used to create the batch model with associated variations (e.g., standard deviations) with the current value aligned to the same time scale.

The analytic processor 114 may also generate a quality prediction graph to determine the effect of the correction(s), if implemented, on the overall quality of the process. If the correction(s) maintain or improve the overall quality to within specified thresholds, the analytic processor 114 may instruct the OMS 102 to implement the correction(s). Alternatively, the analytic processor 114 may send instructions to the controller 108 to implement the process correction(s).

Further, the example analytic processor 114 may generate a microchart upon determining a fault associated with an overall quality variable and/or any other quality variable. The microchart may include values of the process and/or quality variables at a specified time (e.g., a time associated with the process fault) in relation to a mean value and/or a standard deviation for each of the variables as predicted by the batch model. Additionally, the microchart may include spark lines that indicate prior values associated with each of the process and/or quality variables associated with the model. From the microchart, the example analytic processor 114 may enable an operator to determine and/or select one or more corrective actions to the process and/or determine if any of the corrections will improve the process such that the overall quality variable is predicted to be within the specified limits.

The OMS 102 manages access and control to the process control data including the process variation graphs, contribution graphs, variable trend graphs, quality prediction graphs, and/or microcharts via an online data processor 116. Additionally, the online data processor 116 provides access to process control operators to view process control data, change and/or modify process control data, and/or generate instructions for field devices within the process control system 106.

To provide access to the on-line analysis, the plant 104 of FIG. 2 is illustrated as including a router 120 and a local workstation 122 communicatively coupled to the online data processor 116 via a local area network 124 (LAN). Further, the router 120 may communicatively couple any other workstations (not shown) within the plant 104 to the LAN 124 and/or the online data processor 116. The router 120, which may communicatively couple to the other workstations wirelessly and/or via a wired connection, may include any type of wireless and/or wired router as an access hub to the LAN 124 and/or the online data processor 116.

The LAN 124 may be implemented using any desired communication medium and protocol. For example, the LAN 124 may be based on a hardwired or wireless Ethernet communication scheme. However, any other suitable communication medium and protocol could be used. Furthermore, although a single LAN is shown, more than one LAN and appropriate communication hardware within the workstation 122 may be used to provide redundant communication paths between the workstation 122 and a respective similar workstation (not shown).

The LAN 124 is also illustrated as being communicatively coupled to a firewall 128 which determines, based on one or more rules, whether communication from remote workstations 130 and/or 132 is to be permitted into the plant 104. The remote workstations 130 and 132 may provide operators that are not within the plant 104 access to resources within the plant 104. The remote workstations 130 and 132 are communicatively coupled to the firewall 128 via a Wide Area Network (WAN) 134.

The workstations 122, 130 and/or 132 may be configured to view, modify, and/or correct one or more processes within the process control system 106 based on the on-line analysis performed by the OMS 102, or these workstations may directly implement the on-line process analysis applications and methods described herein. For example the workstations 122, 130 and/or 132 may include a user interface 136 that formats and/or displays process control information generated by the OMS 102. As another example, the user interface 136 may receive generated graphs and/or charts or, alternatively, data for generating a process control graph and/or chart from the OMS 102. Upon receiving the graph and/or chart data in the respective workstation 122, 130, and/or 132, the user interface 136 may generate a display of a graph and/or a chart 138 that is relatively easy for an operator to understand. The example configuration of FIG. 2 illustrates the workstation 132 with the analytic user interface 136. However, the workstations 122 and/or 130 may include two analytic user interfaces 136.

Additionally, the user interface 136 may alert a process control operator to the occurrence of any process control faults within the process control system 106 and/or any other process control systems within the plant 104 as determined by the on-line analysis described herein. Furthermore, the user interface 136 may guide a process control operator through an analysis process to determine a source of a process fault and to predict an impact of the process fault on the quality of the resultant product. The user interface 136 may provide an operator process control statistical information as the process fault is occurring, thereby enabling the operator to make any adjustments to the process to correct for any faults. By correcting for faults during the process, the operator may maintain a quality of the resulting product.

Additionally, the user interface 136, via the example OMS 102, may display the detection, analysis, corrective action, and quality prediction information. For example, the user interface 136 may display a process overview chart, a process variation graph, a microchart, a contribution graph, a variable trend graph, and/or a quality prediction graph (e.g., the graph 138). Upon viewing these graphs 138, the operator may select additional graphs 138 to view multivariate and/or statistical process information to determine a cause of a process fault. Additionally, the user interface 136 may display possible corrective actions to a process fault. The user interface 136 may then allow an operator to select (one or more) corrective actions. Upon a selection of a correction, the user interface 136 may transmit the correction to the OMS 102, which then sends an instruction to the controller 108 to make the appropriate correction in the process control system 106.

The workstations 122, 130 and/or 132 of FIG. 2 may include any computing device, for example, a personal computer, a laptop, a server, a controller, a personal digital assistant (PDA), a micro computer, etc. The workstations 122, 130 and/or 132 may be implemented using any suitable computer system or processing system. For example, the workstations 122, 130 and/or 132 could be implemented using a single processor personal computer, single or multi-processor workstations, etc.

The process control environments 10 of FIGS. 1 and 100 of FIG. 2 are provided to illustrate types of systems within which the example methods and apparatus described in greater detail below may be advantageously employed. However, the example methods and apparatus described herein may, if desired, be advantageously employed in other systems of greater or less complexity than the example process control environments 10 and 100 and/or the process control system 106 shown in FIGS. 1 and 2 and/or systems that are used in connection with process control activities, enterprise management activities, communication activities, etc.

Currently, many process control systems provide analytic and/or statistical analysis of process information. However, these systems generally implement offline tools to determine the cause and potential corrective actions of process faults that may affect the quality of resulting products. These offline tools may include process studies, lab studies, business studies, troubleshooting, process improvement analysis, and/or six-sigma analysis. While these tools may correct the process for subsequent products, the tools cannot remediate and/or correct process quality as the fault occurs. Thus, these offline tools do not prevent manufacturing bad quality products.

The example on-line batch process control system analyses described herein, on the other hand, may be used within a process control system to provide in-process fault detection, analysis, and/or correction information enabling an operator to correct a process fault while the product is being manufactured. In other words, process corrections can be implemented in response to predicted faults, at the time a fault occurs or substantially immediately after a fault occurs. While the example methods and apparatus described herein may be used to predict and/or correct process faults to improve process quality of a batch and/or continuous process, they will be particularly described with respect to batch processes. Additionally or alternatively, the example methods and apparatus may be used to correct product quality by predicting product quality and correcting corresponding process faults and/or by correcting detected process faults.

Figure 3:
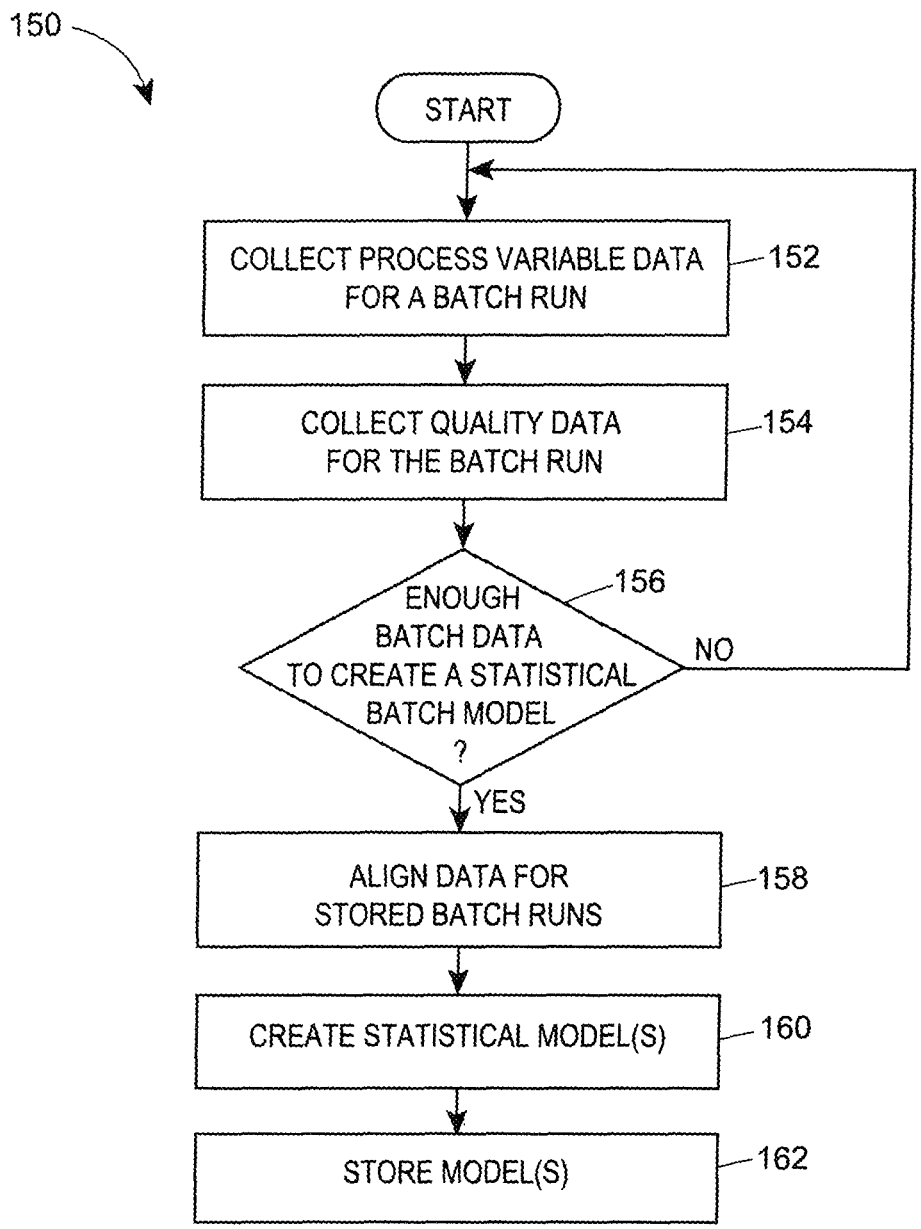
FIG. 3 is a flow chart of an example method of determining a statistical batch model for a batch process.

FIG. 3 depicts an example flow diagram 150 of a method that may be implemented by the OMS 102 (which may run the routine 50 of FIG. 1) to develop a statistical batch model for a batch process and to then use that statistical batch model to analyze data from an on-line batch process run. At a block 152, the OMS 102 collects batch data for a particular batch. This batch data may include measured, calculated or estimated process variable values for a number of different process variables for a particular batch run of the process including, for example, input variables such as raw material compositions and other initial conditions for the batch, ongoing process variables such as temperatures, flow rates, levels or other process variable measurements, estimated process variables, environmental data such as humidity, ambient temperature, etc., lab data including any data measured or obtained off-line in one or more lab analyses, etc. This data is collected by a data historian (such as the historian 12 of FIG. 1) for a previously run batch. If desired, a user or operator may select a particular batch run, the data for which is stored in a data historian, to use in the modeling process. At a block 154, after the completion of the batch run for which data was collected at the block 152, and/or at the end of different various stages, operations or phases of the batch, the OMS 102 collects quality measurements or quality data for the batch run. The quality data may include any type of measurement or indication of quality of the output of the batch or of the output of one of the stages, operations or phases of the batch including, for example, material consistency, concentrations of a particular chemical or element, pH, material compositions or ratios, and/or any other quality data that indicates the success of the batch run in producing an acceptable or desirable output. Of course, the particular quality data to be collected will be dependent upon the type of product being manufactured, and this quality data may be measured on-line, may be determined by lab analyses, may be determined by visual inspection (and input by a user), may be calculated based on other parameters, or may be determined in any other known manner. Moreover, this quality data may be obtained from a batch historian if this data is stored therein or via on-line processes or off-line lab analyses.

Figure 4:
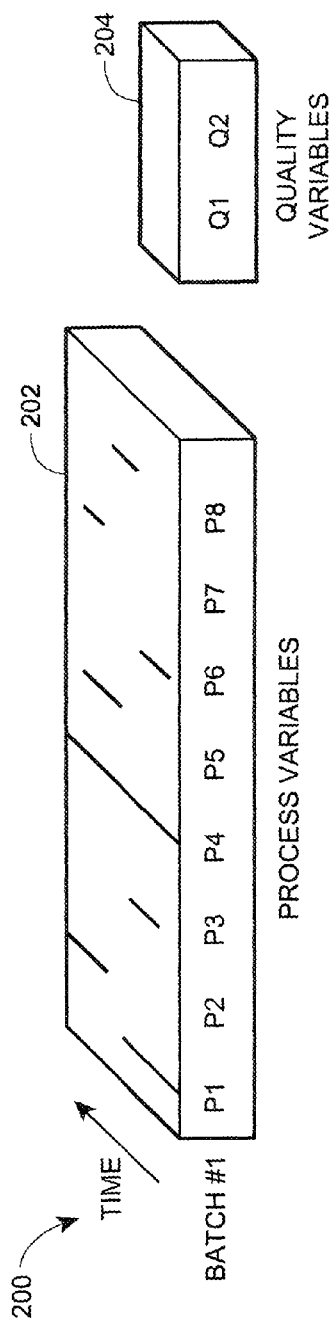
FIG. 4 is a diagram representing a data structure of an example batch run of a batch process, including process variables measurements and quality variable measurements associated with the batch process run.

FIG. 4 represents a data structure 200 for an example batch run (e.g., Batch #1) including measured process variables 202 and calculated or otherwise measured or determined quality variables 204, which may include one or more overall quality variables obtained at the end of the batch run via measurements or observations. Batch processes typically include one or more process stages, with each stage including one or more operations and each operation including one or more phases. As such, the example measured process variables 202 may include process variables (also referred to as process parameters) from a single phase, operation or stage or process variables that span multiple phases, operations or stages of the batch process. By way of example, the variable P1 illustrated in FIG. 4 may correspond to a fluid flow rate (e.g., a process variable), while the variables P2-P8 may correspond to temperature, pressure, another flow rate, etc. The variables 204 may correspond to quality variables, such as concentration, etc. While the batch process of FIG. 4 is illustrated as including eight measured process variables 202 and two quality variables 204, in other examples, the batch process may include fewer or more process variables and or more or less quality variables. Additionally, the batch process data is collected during a time period shown along the t-axis (labeled as "Time" in FIG. 4).

The data graph 200 of FIG. 4 illustrates that some of the process variables 202 are relevant for only certain times during the batch process. For example, the process variable P1 is relevant from the start of the batch to a midway point through the batch (or the stage, operation or phase of the batch for which data was collected). Thus, if the variable P1 is associated with a fluid flow rate, fluid may only be flowing within the batch process from the beginning of the batch to a midpoint of the batch. After this point, the batch may not utilize a fluid flow and thus, the variable P1 is not relevant to the batch process at that time. In contrast, the variable P4 of FIG. 4 is relevant for the entire batch process.

The example quality variables 204 may be associated with the entire batch process or may be associated with a particular phase or stage of the batch process. The quality variables 204 may be the result of a multivariate, statistical, and/or algebraic relationship between the measured process variables 202 and/or other quality variables 204, may be measured or determined in any known manner or may be input by a user. For example, the quality variable Q1 may correspond to a composition quality of a product that resulted from the batch process. Q1 is a quality variable even though it may not be directly measurable within the process control system 106. Instead, the composition quality variable Q1 may be modeled and/or determined from a multivariate combination of the measured variables 202 or may be determined by a lab analysis with some time delay.

Referring back to FIG. 3, the OMS 102 next determines, at a block 156, if batch data has been collected for enough batch runs of the process to create an adequate statistical model for the batch. If not, the block 156 returns control to the block 152 to collect further process variable data for another run of the batch process. If so, a block 158 aligns the batch data from the stored batch models.

Figure 5:
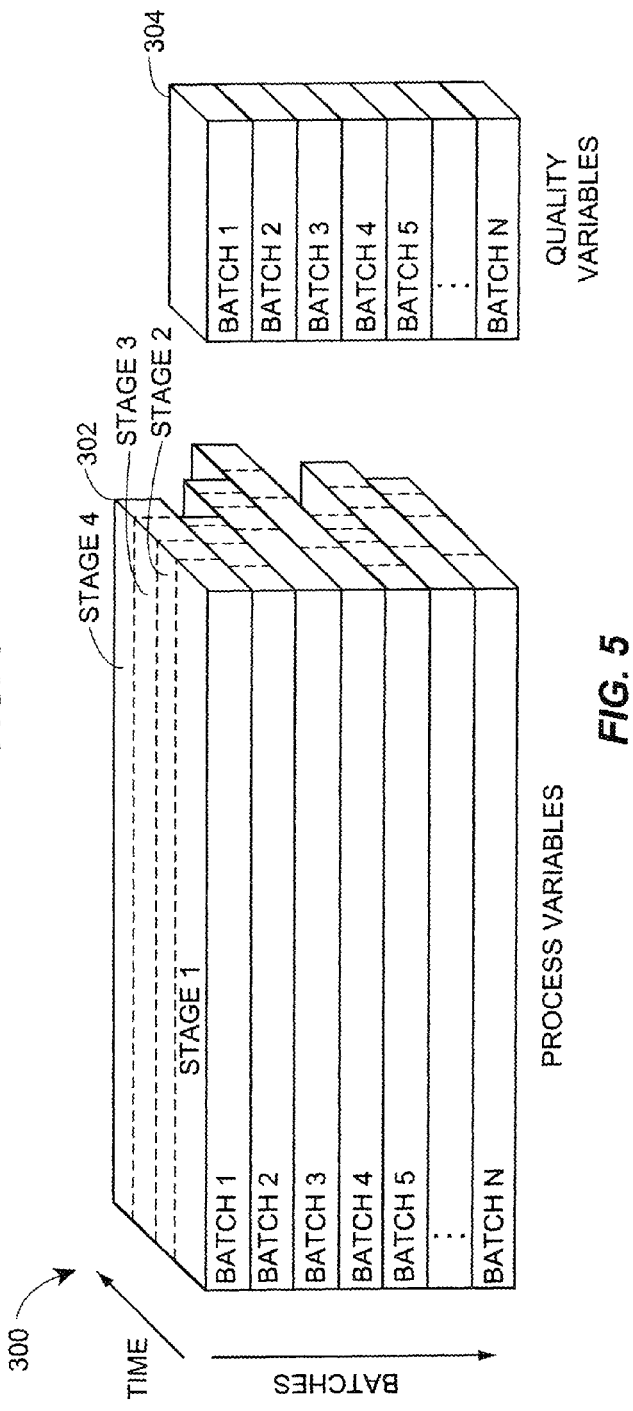
FIG. 5 is a diagram of a data structure illustrating batch data for a number of different batch runs of a batch process, including process variables and respective quality variables for each of the batch runs.

To illustrate this point, FIG. 5 represents a data structure 300 associated with a set of example batch runs that may be obtained in the blocks 152-156 of FIG. 3 and stored in a memory at the start of the block 158. As illustrated, the data structure 300 includes process variables 302 and respective quality variables 304 for each of a number of batch runs. The batch runs (e.g., BATCHES 1-N) show that this particular batch process includes four stages (e.g., STAGES 1-4) that are executed in a serial order. For example, STAGE 1 may correspond to a combination and mixing of chemicals in a batch while STAGE 2 may correspond to baking of those mixed chemicals in the batch. These stages may further be subdivided into operations, phases, and/or levels. Additionally, the quality variables 304 may correspond to the measured process variables 302 at each batch stage, phase, operation or level, and/or may correspond to the end of the batch.

The example data structure shown in FIG. 5 illustrates that each individual batch may differ in time duration, with the start and finish times of each stage of the batch also differing between batches. For example, BATCH 2 is completed in a shorter time than BATCH 1, but BATCHES 3 and 4 are completed in a longer time than BATCH 1. Furthermore, BATCH 1 requires a longer time to complete STAGE 1 than BATCH 2.

Referring back to FIG. 3, the block 158 aligns the batch data of FIG. 5 to enable the creation of the batch model. In some cases, this data may be aligned by expressing the relevant time duration of each variable (not shown) as being proportional to the length of time for the corresponding stage(s). Thus, the varying time to complete batches and/or stages may be resolved using the measured process variables 302 within each batch. In another example, the well-known DTW method discussed above may be used to align the batch data to a constant or normalized time frame which may be, for example, a median time frame of all the batches, an average time frame of all of the batches, or some other time frame such as that associated with a control batch or a selected batch. As aligned, the batch data would appear as illustrated in the data structure 350 of FIG. 6, in which the time frame of each batch is normalized to be exactly the same and all of the stages are aligned with one another, with the actual data points within each batch being skewed in time by being expanded or contracted in time, so as to match up with the normalized time frame to be used in batch model. Of course, the time within each stage (phase or operation) may be skewed differently based on the times of those stages (phases or operations) with respect to the normalized time for that particular stage (phase or operation), so as to make all the stages separately aligned. In any event, any known methods, such as the DTW method, may be used to time-align the batch data from the different batch runs prior to processing the batch data or developing a statistical model.

Figure 6:
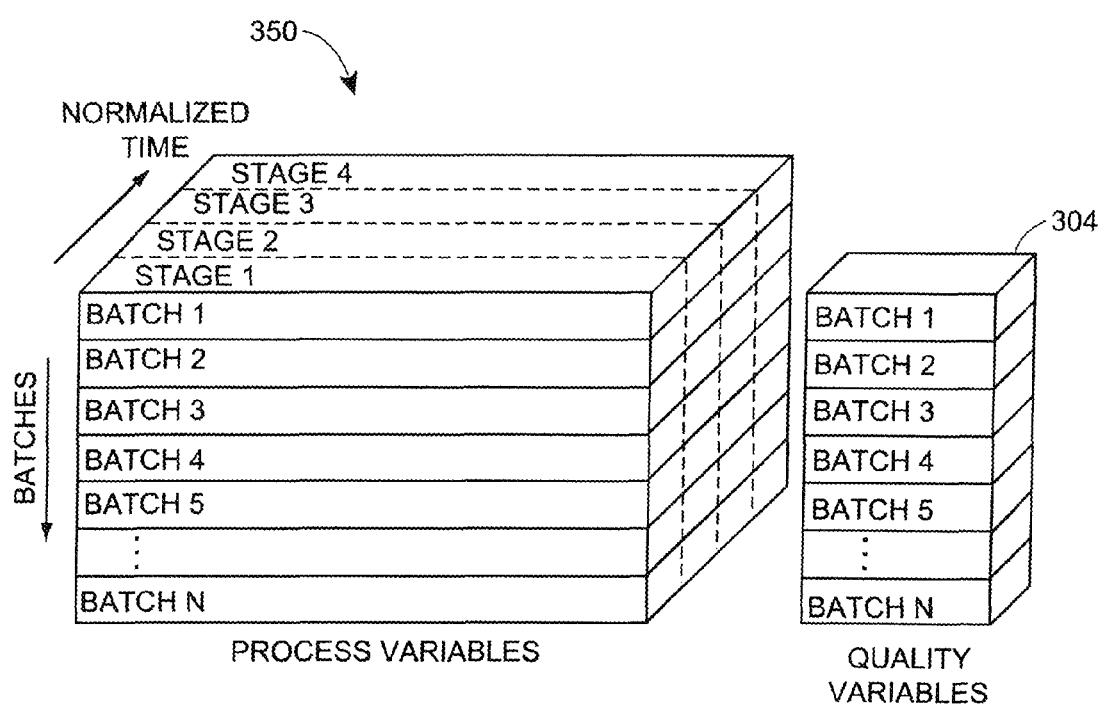
FIG. 6 is a diagram of a data structure illustrating batch data for a number of different batch runs of a batch process, including process variables and respective quality variables, after the data from the batch runs has been aligned in an off-line alignment process.

As will be understood, because of the expansion and contraction of the time frame within the different batch runs to create the data structure of FIG. 6, more or fewer data points for each batch run may be provided or associated with each of the different stages of the normalized data. If desired, this data may be converted to a fixed number or a fixed set of normalized data points (e.g., using linear or non-linear interpolation) so that each of the batches used to create the batch model have the same number of data points, or so that there are data points for each of the same times within the normalized time frame of the batch model. Of course, as noted above, the values of points within the data may be obtained by interpolation between multiple points using straight-line interpolation or any other desired interpolation, such as non-linear interpolation. Moreover, it will be understood that each data point collected for the various batch runs may be a statistical data point, such as an average value, a median value, etc. of a set of consecutively collected raw data points. Thus, for example, a single data point for a batch run may be created as a statistical combination (typically but not necessarily an average) of any desired number of raw data points (e.g., 10, 100, or any other number) to reduce the model size and processing times associated with the model processing. Of course, the number of raw data points used to create any particular statistical data point in the batch runs may be based on the measurement frequency of the raw data as compared to the overall length of time within the batch, etc.

Once the batch data from the different batch runs has been aligned, as illustrated in FIG. 6, a block 160 (FIG. 3) creates a statistical batch model composed of stage models from the aligned data to define, from a statistical standpoint, the normal or expected operation of the batch process as defined by the data collected from the different batch runs in steps 152-156. One method of creating a statistical batch model creates one or more model process variable trajectories for each of the process variables within the batch runs, wherein each such model process variable trajectory identifies or expresses the expected or normal operation of a process variable over the time period in which the process variable is relevant to batch operation. This time period may be, for example, the entire length of the batch, one or more batch stages, phases, operations, levels, etc. As an example, each model process variable trajectory may define as the expected value of the process variable as, for example, the average or the median value of the process variable (as calculated from the collected batch data) at each time position during the normalized time frame of the model. Additionally, if desired, each model process variable trajectory may include one or more standard deviations associated with the collected batch data at any particular time to indicate the typical variation of the batch data for that variable at that particular time.

Referring again to FIG. 3, the block 160 may also or alternatively develop other statistical models such as a PCA (principal component analysis) model or a PLS (projection to latent structures) model. As is known, the PCA modeling technique develops a set of principle components for the batch modeling data and PCA model matrix, which can then be used to analyze other batch data, such as data from an on-line batch. Still further, the PLS modeling technique performs a PLS calculation to associate the process variable data collected or determined for the batches runs with the quality variables that were measured, calculated or otherwise determined for the batch runs used in the model. A PLS model can then be used to predict the quality variables of future batches based on the statistical values of variables within measured batches. PCA and PLS modeling techniques are well known and therefore will not be described in detail herein. Of course, if desired, other types of statistical batch models can be created from the aligned batch data of FIG. 6. In any event, after one or more statistical batch models are created, a block 162 stores these models in a computer readable memory, such as in a memory 52 of FIG. 1, for later use.

Figure 7:
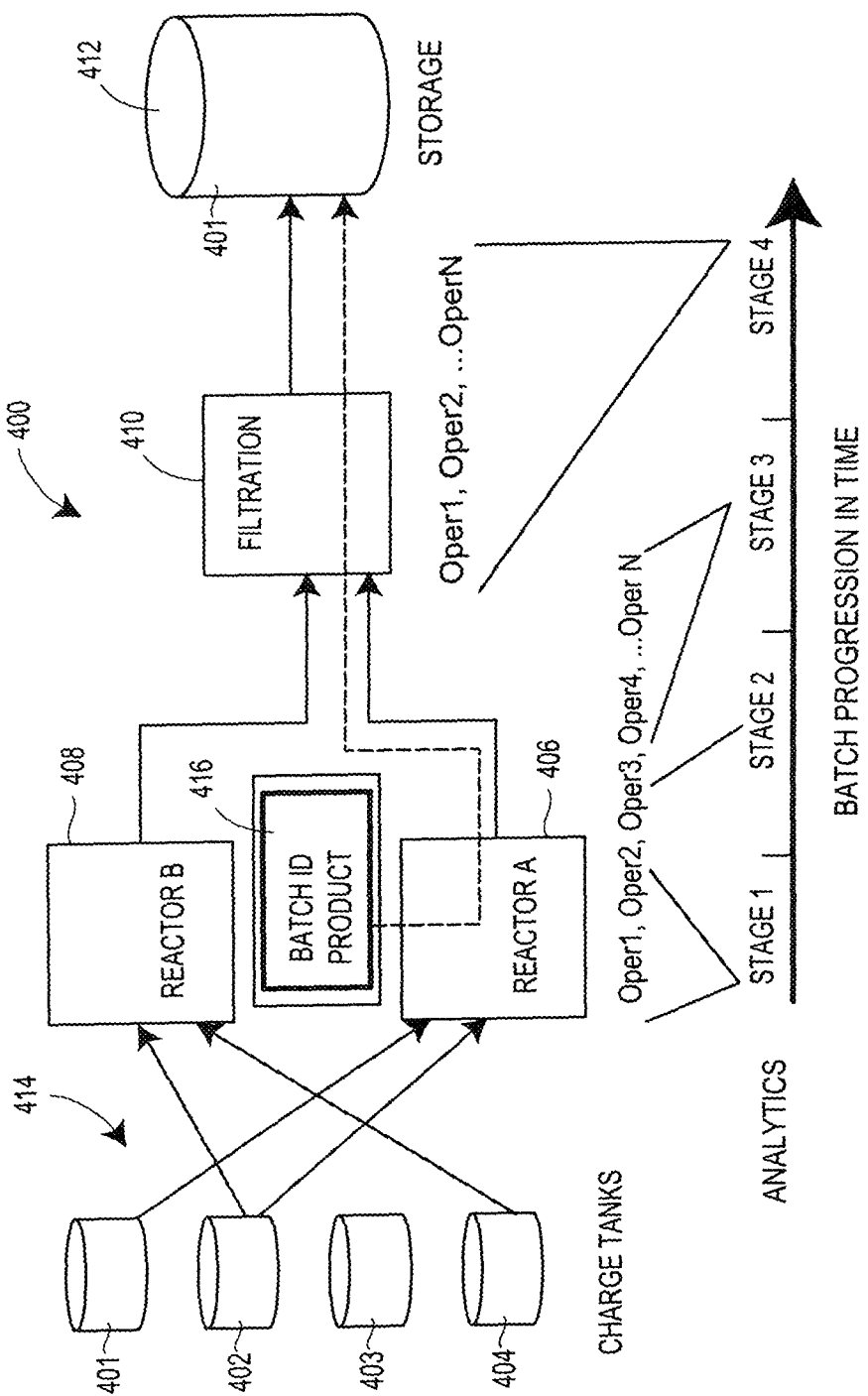
FIG. 7 is a block diagram illustrating a multi-stage batch process.

FIG. 7 shows an example processing facility in which an example multi-stage batch (or continuous) process may be implemented and in connection with which multi-stage modeling may be performed. The illustrated example processing facility 400 includes a plurality of charge or storage tanks 401, 402, 403, 404, a reactor A 406, a reactor B 408, a filtration unit 410, and a storage tank 412. As indicated by the arrows 414 in FIG. 7, for the illustrated example batch process, the reactor A 406 is loaded with raw material process inputs from the charge tanks 401 and 402, and the reactor B 408 is loaded with raw material process inputs from the charge tanks 402 and 404. These materials are processed in the reactor A 406 and the reactor B 408, and the resulting products are passed to the filtration unit 410 where they are filtered to produce a filtered product, which is then loaded into and stored in the storage tank 412, for subsequent further processing or use.

To facilitate modeling, and to allow for more accurate modeling, this example batch process, which may entail any number of operations or steps (e.g., loading, reacting, filtering, storing, etc.), may be resolved into a plurality of process phases or stages, each of which may encompass one or more operations or steps. For example, a first process stage (Stage 1) may include directing raw materials into the reactor A 406 and the reactor B 408 and then processing those raw materials to produce reaction products. A second process stage (Stage 2) may include directing those reaction products into the filtration unit 410. A third process stage (Stage 3) may include a series of filtering operations performed within the filtration unit 410 in order to produce a desired filtered product, and a fourth process stage (Stage 4) may include a further series of operations to transfer the filtered product into the storage tank 412.

In general, a model of the entire batch process may be developed by developing a separate model corresponding to each process stage. In the example process illustrated in FIG. 7, a model may be developed for each of Stages 1-4. The model corresponding to each stage may be developed by collecting data from each of a plurality of batches produced by the batch process. In order to differentiate the data collected in connection with separate batches, a unique Batch ID 416 may be assigned to each batch produced and associated with all data collected and stored, such as in data historians, in connection with the batch run of the process that resulted in the production of that batch.

Figure 8:
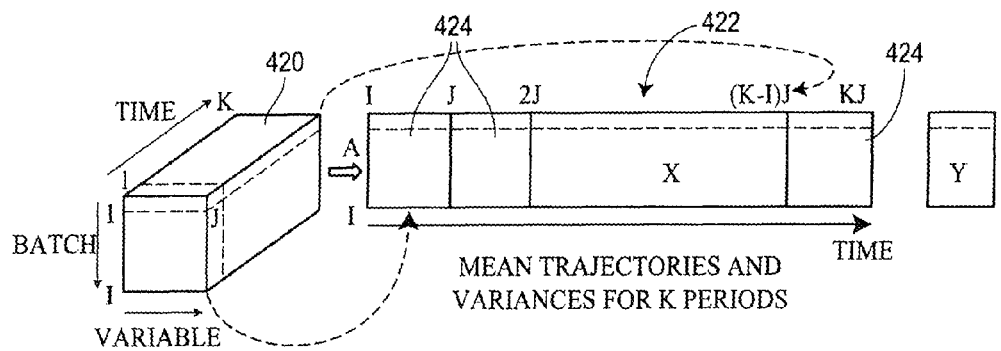
FIG. 8 is a diagram illustrating batch-wise unfolding of process data for a single process stage.

FIG. 8 graphically depicts batch-wise unfolding of process data for a single process stage. The process data may be obtained from a number of batch runs, which may be used as a training data set for development of an analytical model of the batch process or, in the case of a multi-stage process, an analytical model of each stage of the batch process.

As shown, a data file 420 used to store batch data comprise a three-dimensional array of data for each of I batches or batch runs of an industrial batch process, with J variables and K scan periods. The data file 420 stores values for each of the J variables used in a batch run. Values may be obtained and stored for all or some of the J variables during all or some of the K scan periods of each of the I batches. For a simple single-stage batch process this type of unfolding is satisfactory. However, for multi-stage batches, data should be unfolded for every stage separately as shown in FIG. 9 and described in more detail below.

Prior to development of an analytical model of the process, the data file 420 is unfolded into a two-dimensional array 422 of dimensions I×KJ as shown in FIG. 8. Each of the K scan periods is represented as a two-dimensional array 424 of dimensions I×J which may include variables for some or all of the J variables for some or all of the I batches. In unfolding the data file 420, the K two-dimensional arrays 424 of data (i.e., one for each of the K scan periods) are arranged side-by-side to form the two-dimensional array 422 as shown.

Figure 9:
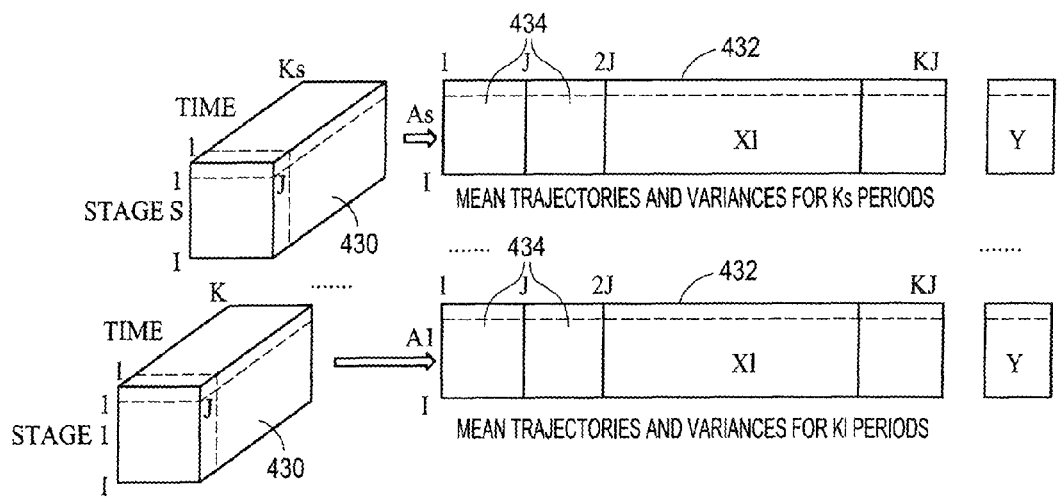
FIG. 9 is a diagram illustrating batch-wise unfolding of process data for multiple process stages.

A similar data unfolding scheme may be employed for a multiple-stage batch process, as illustrated in FIG. 9. As shown, data for each process stage initially may be stored in a three-dimensional array 430, similar to the three-dimensional array 420 shown in FIG. 10. The three-dimensional array 430 has dimensions Ii×Ji×Ki, where $1 \leq i \leq S$, where S is the total number of stages making up the entire batch process. Thus, the data are represented in S three-dimensional arrays 430, with each array 430 storing data for J variables for I batches and for K scan periods for a particular one of the process stages i between 1 and S. The data in each three-dimensional array i 430 is unfolded into a two-dimensional array 432 of dimensions Ii×KiJi in which Ki two-dimensional arrays 434 of dimensions Ii×Ji are once again arranged side-by-side.

Figure 10:
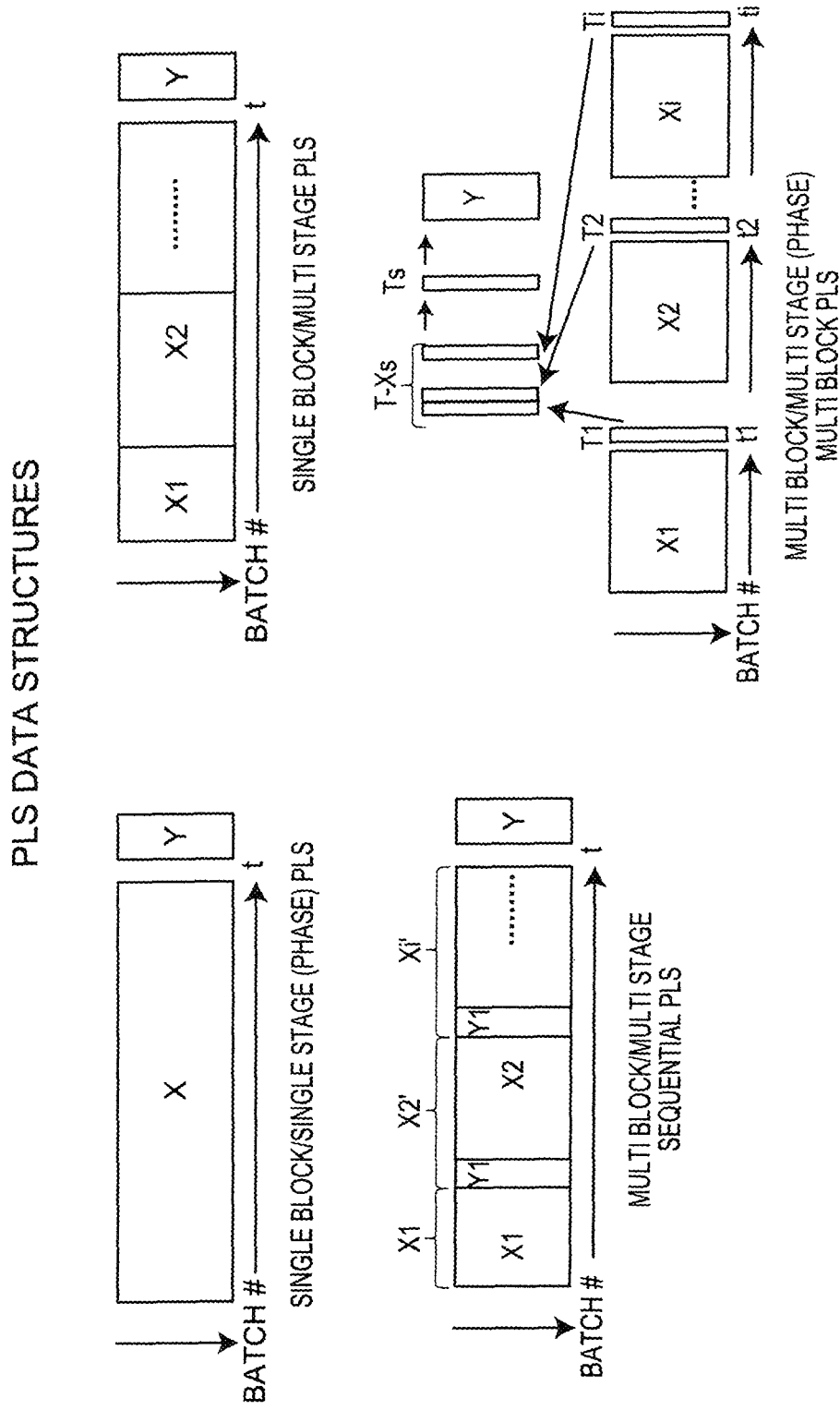
FIG. 10 is diagram representing data structures for single-block and multi-block PLS modeling.

FIG. 10 illustrates several single-block and multi-block data structures that may be employed for PLS modeling of a multi-stage industrial process. The simplest data structure (illustrated in the upper left-hand portion of FIG. 10) employs a single block X for all data used to develop a model of a process and a block Y for an end-of-batch product quality indication which may be calculated or measured for the batches used to produce the data for the block X. In this single-block, single-stage data structure, a batch is treated as one stage and all data for all stages are unfolded and synchronized, as described above, and one PLS model is then developed for the batch, as if the process were a single-stage process. Because most processes or process stages are significantly affected, in terms of end-of-batch or end-of-stage product quality, by conditions existing before the process or process stage is run, all data from the beginning of the batch or stage up to the current time are often employed for making quality predictions. These conditions, referred to in process modeling as "initial conditions," primarily include indications of the quality or state of raw or preprocessed materials used in the process or other permanent conditions which are known at the beginning of the stage and affect end-of-stage or end-of-batch product quality.

Another data structure, shown in the upper right-hand portion of FIG. 10, employs blocks X1, X2, ..., Xi for data used to develop models of individual process stages 1, 2, ..., i, respectively. This data may be combined in a single block and used, together with an associated end-of-batch product quality indication Y, as shown in the upper right-hand portion of FIG. 10, to construct a PLS model of the process, or separate end-of-stage quality indications Y1, Y2, ... Yi may be employed, as shown in the lower left-hand portion of FIG. 10, to construct the PLS model of the process. If end-of-stage quality indicators are unavailable, an end-of-batch quality prediction may be calculated at the end of the stage and used instead, or could be used in addition to end-of-stage quality indicators, if available.

Rather than constructing a PLS model of the process using stage data blocks X1, X2, ..., Xi and end-of-stage product quality predictions Y1, Y2, ... Yi, the PLS model may be constructed using score matrices or latent structure scores T1, T2, ..., Ti for each of the i stages along with the stage data blocks X1, X2, ..., Xi, as shown in the lower right-hand portion of FIG. 10. The score matrices or latent structure scores T1, T2, ..., Ti may be combined to form a latent structure TS which may, in turn, be used to form an end-of-batch product quality prediction Y, as shown, for use in constructing a PLS model of the multi-stage process. Alternatively, or in addition to these latent structure scores, end-of-stage quality or end-of-batch quality predictions may be formed at the end of the stage.

Figure 11:
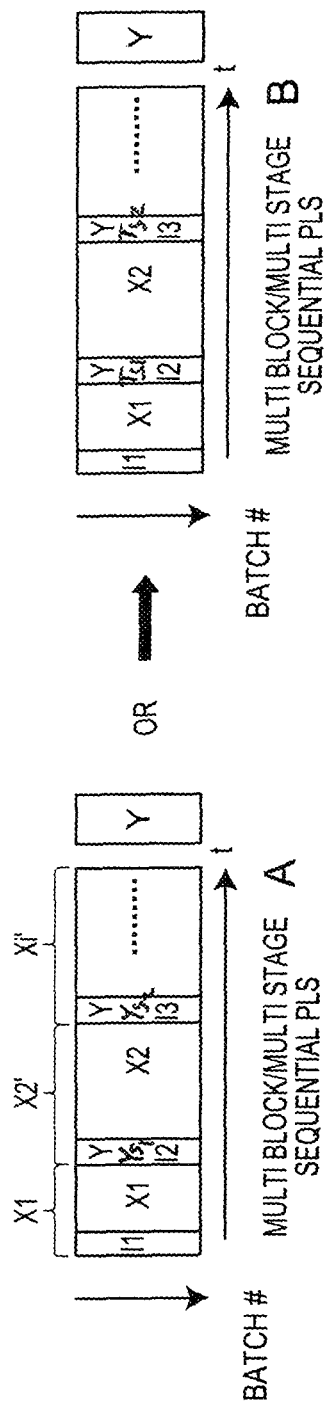
FIG. 11 is a diagram representing data structures for multi-stage, multi-block modeling wherein end-of-batch quality or end-of-stage calculation term values from one process stage are transferred to the subsequent process stage.

FIG. 11 is a diagram representing data structures for multi-stage, multi-block modeling in which end-of-batch quality or end-of-stage calculation term values are developed in one process stage and transferred to the next process stage. As shown, a data structure A for a multi-block batch model (shown in the left-hand portion of FIG. 11) includes data blocks X1, X2, etc., for stage data obtained during runs of process stages 1, 2, etc., respectively. In addition, the data structure A also includes an additional block I1, I2, etc. for each stage for initial conditions pertinent to that stage. For stages following the first stage, these additional blocks also may include end-of-batch quality predictions Y or end-of-stage calculation terms or other parameter prediction information from the immediately preceding stage. Thus, the additional block for the data block X2 corresponding to the second process stage may include initial conditions I2 and also an end-of-batch product quality prediction Y developed by the model for the first process stage.

An alternative data structure B, shown in the right-hand portion of FIG. 11, is similar to the data structure A, except that the additional blocks for stages following the first stage include quality calculation terms (scores numerator-denominator) and possibly confidence interval calculation terms T from the preceding stage, in addition to, or as an alternative to, the end-of-stage product quality predictions used in the data structure A as described above.

The end-of-batch product quality predictions Y or more specifically the quality calculated deviation from the mean values can be rescaled by a scale factor λ, where 0<λ<1, in order to diminish the effect that information from the previous stage has on end-of-batch quality prediction relative to the effect of information from the current stage. Also, principal components may be used, and confidence interval calculation terms derived from stage data may be transferred to succeeding stages as still additional parameters via the additional blocks as described above.

Figure 12:
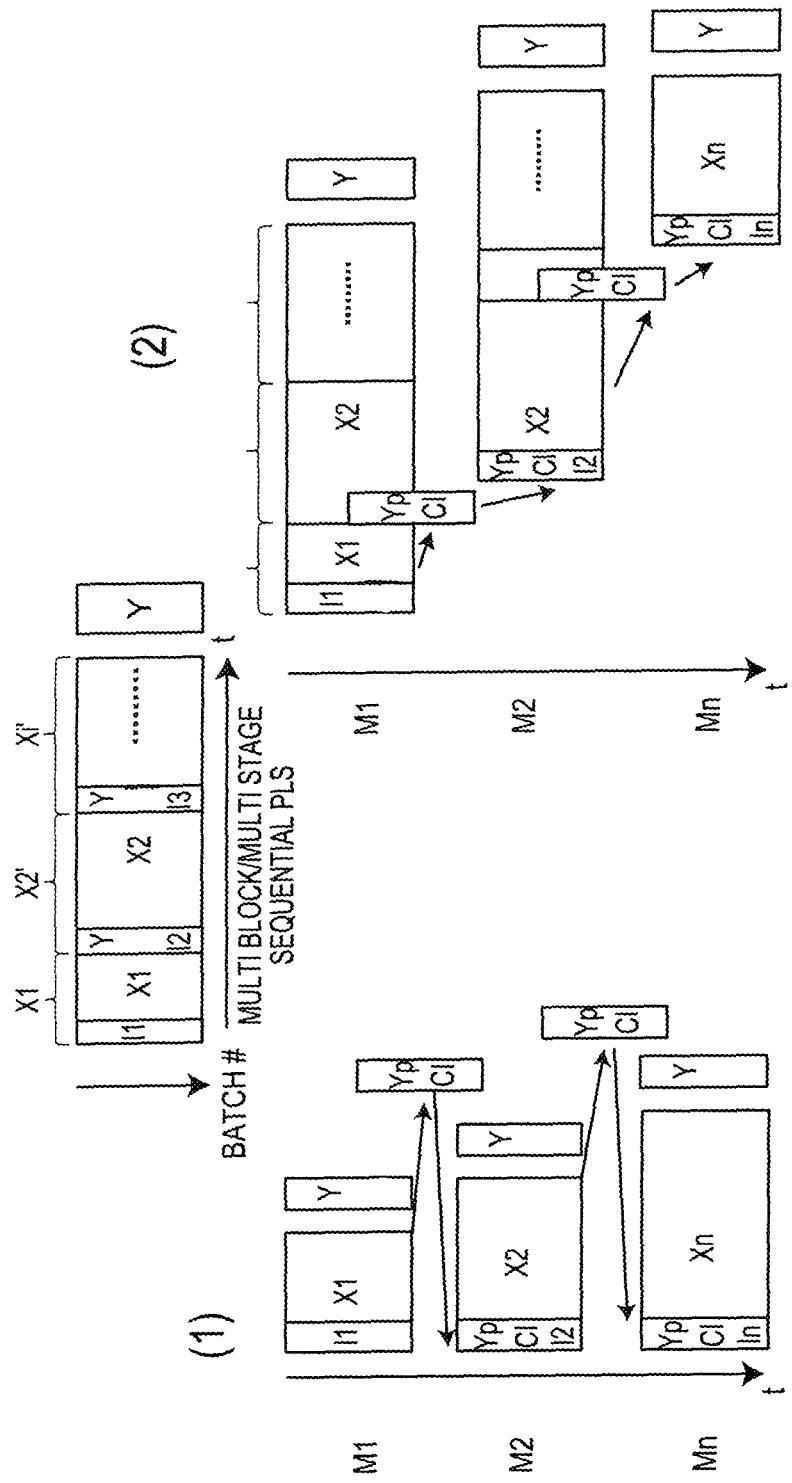
FIG. 12 is a diagram illustrating two alternate modeling procedures for multi-block, multi-stage models.

FIG. 12 is a diagram illustrating two alternative modeling procedures for multi-block modeling of multi-stage processes. In the illustrated example, a multi-stage batch process is run a plurality of times to obtain process data and end-of-batch quality data for use in constructing the model. Data blocks X1, X2, etc. store data obtained from each of the stages of the multi-stage batch process, as described above. A quality prediction block Y stores data relating to the end-of-batch product quality for each run of the multi-stage batch process. Once all of this data is collected, and aligned as described above, a PLS model of the process may be constructed using, by way of example, one of the two procedures illustrated in FIG. 12.

Procedure (1), illustrated in the left-hand portion of FIG. 12, involves construction of a series of models M1, M2, ..., Mn, respectively, for the n stages of the multi-stage batch process. A PLS model M1, for the first stage of the multi-stage batch process, is constructed from the data block X1 of process data obtained from stage 1, an initial condition block I1 containing data indicative of initial conditions pertinent to stage 1 of the multi-stage batch process, and an end-of-batch product quality data block Y containing data indicative of end-of-batch product quality obtained during the plurality of runs of the multi-stage batch process from which the data used to construct the PLS model was obtained. Once the PLS model M1 is constructed for stage 1, the PLS model M1 is run using the stage 1 data block X1 and the stage 1 initial condition block I1 to produce a predicted end-of-batch product quality indication Yp for stage 1 and, optionally, a corresponding confidence interval CI, which is a well-known statistical measure of the accuracy of the predicted end-of-batch product quality indication Yp. The confidence interval CI provides a way to gauge the accuracy of the predictive capability of the model with respect to both how well the model predicts the outcome of the process and how closely the actual batch data matches the training data used in developing the model (i.e., whether noise or other inaccuracy renders the batch data disparate form the data expected by the model). The predicted end-of-batch product quality indication Yp, and the confidence interval CI if desired, are then included in the initial condition block I2 to be used in constructing a PLS model M2 of the second stage of the multi-stage batch process.

The PLS model M2, in turn, is constructed from the stage 2 data block X2, the stage 2 initial condition block I2 (including the predicted end-of-batch product quality indication Yp obtained from the PLS model M1 of stage 1 and associated confidence interval CI), and the end-of-batch product quality data block Y. Similarly, the PLS model M2, once constructed, is run using the stage 2 data block X2 and the stage 2 initial condition block I2 (including Yp and CI produced by the model M1) to produce a predicted end-of-batch product quality indication Yp for stage 2 and, a corresponding confidence interval CI is calculated. Again, the predicted end-of-batch product quality Yp and confidence interval CI from stage 2 may be included in the initial condition block I3 to be used in constructing a PLS model M3 of the third stage of the multi-stage batch process. This process is repeated for each stage of the multi-stage batch process, with the initial condition block Ii used for the model of stage i including the predicted end-of-batch product quality indication Yp and confidence interval CI from the preceding stage. Similarly, the initial conditions Ii of each stage may further include the initial conditions of each preceding stage.

Procedure (2) for multi-block modeling of a multi-stage batch process, illustrated in the right-hand portion of FIG. 12, is similar to procedure (1), except that the model M1 is constructed using data blocks X1, X2, ..., Xn for all n stages of the multi-stage batch process, instead of just the data block X1 containing data from stage 1. However, procedure (2) proceeds in a manner similar to procedure (1), in that a PLS model M1 is constructed from the data blocks X1, X2, ..., Xn, an end-of-batch product quality data block Y, and an initial condition data block I1. The constructed PLS model M1 is then run using the data block X1 and the initial condition data block I1 as inputs to produce a predicted end-of-batch product quality indication Yp and an associated confidence interval, which are then included in the initial condition data block I2 used to construct a PLS model M2 of the second process stage based on the data blocks X2, X3, ..., Xn, but not the data block X1, along with the end-of-batch product quality data block Y and the initial condition data block I2. As in procedure (1), this process is repeated in procedure (2) for each of the n stages of the multi-stage batch process to construct the PLS model of the entire multi-stage batch process.

Figure 13:
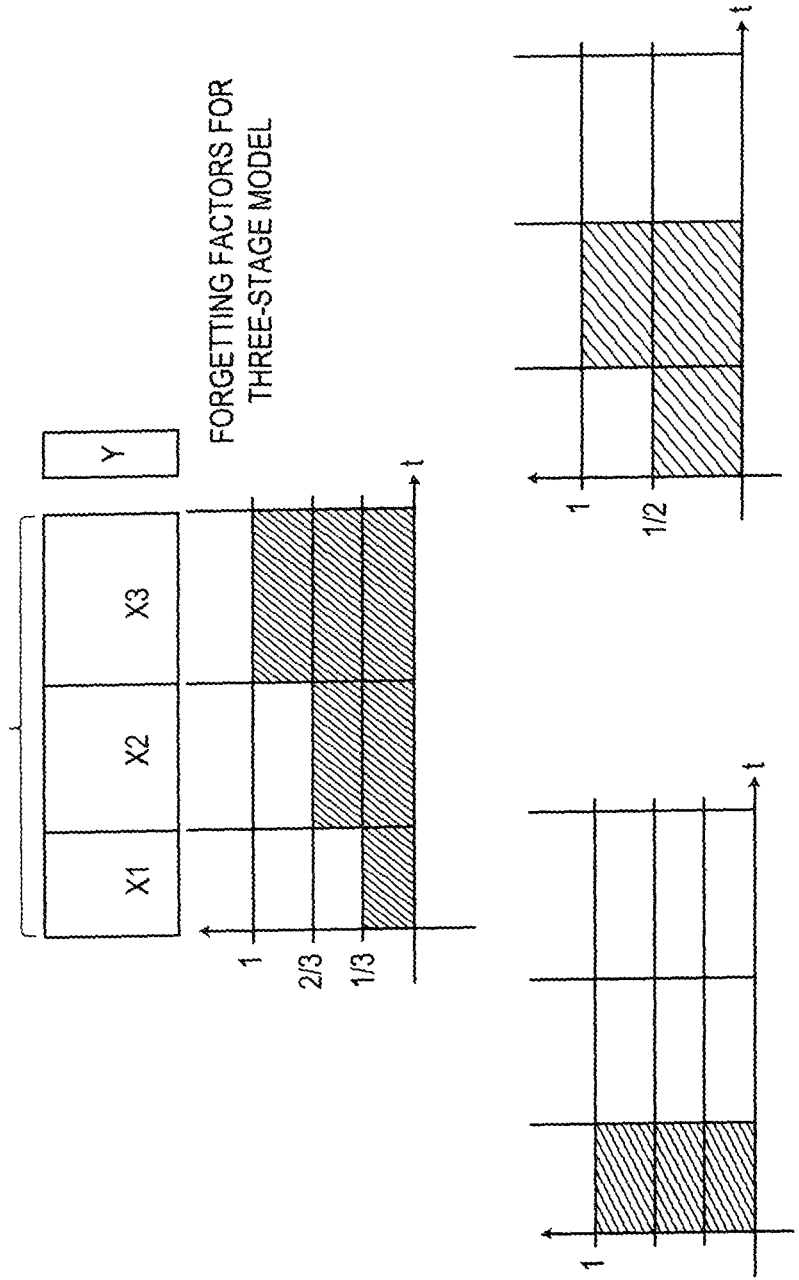
FIG. 13 is a diagram illustrating a PLS model employing a forgetting factor for modeling a three-stage process.

FIG. 13 is a diagram illustrating a PLS model employing a forgetting factor for modeling a three-stage process. A so-called "forgetting factor" is a scale factor used to reduce the impact that process data obtained in early stages in a process has on, for example, end-of-batch product quality predictions made in later stages of the process. The rationale for employing a forgetting factor is that while each stage of a process may have an impact on the quality of the product ultimately produced by the entire process, the impact of each processing stage is most significant during and immediately following that stage and diminishes as the process advances to later stages.

In the case of the example three-stage batch process illustrated in FIG. 13, a PLS model may be developed using a data block X1 containing data produced during stage 1 of a plurality of runs of the process and data blocks X2 and X3 containing data produced during stages 2 and 3, respectively, of those runs, as well as an end-of-batch product quality data block Y containing data relating to end-of-batch quality of the products produced during those runs. Instead of weighting the data blocks X1, X2, and X3 for the stages 1, 2, and 3 equally, a forgetting factor is applied continuously to each data block to weight process data from later stages of the process more heavily than process data from earlier stages of the process.

In the illustrated example, in constructing a model of stage 1, a forgetting factor of 1 (in effect, no forgetting) is applied to the data block X1. In constructing a model of stage 2, a forgetting factor of 1 is applied to the data block X2, but a forgetting factor of ½ is applied to the data block X1. In constructing a model of stage 3, a forgetting factor of 1 is applied to the data block X3, a forgetting factor of ⅔ is applied to the data block X2, and a forgetting factor of ⅓ is applied to the data block X1. In this way, the process data from each stage makes more significant contributions to end-of-batch quality predictions associated with that process stage than process data from earlier stages of a multi-stage process. A forgetting factor also may be applied continuously throughout the stages of a process model.

Figure 14:
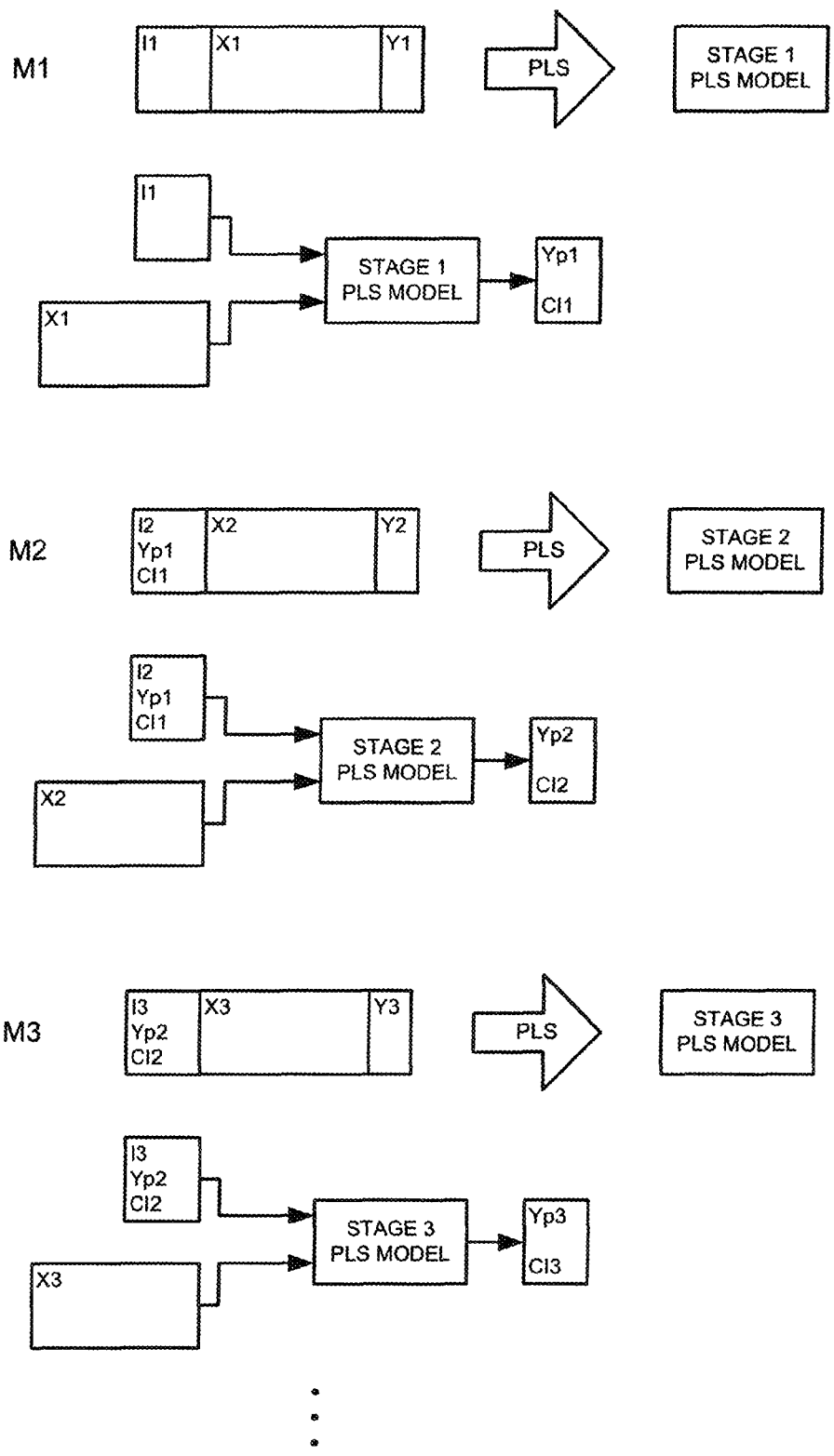
FIG. 14 is a diagram illustrating development of a PLS model of a multi-stage batch process.

FIG. 14 illustrates one exemplary approach to developing a PLS model of a multi-stage batch process from training data collected from a plurality of runs of the multi-stage batch process (or extracted from a data historian containing data from previous batch runs as explained above). Once developed, such a PLS model of a multi-stage batch process may be used, for example, in performing either of the two exemplary process modeling procedures shown in FIG. 12.

As shown in FIG. 14, a training data set for stage 1, comprising initial condition data I1, process variable data X1 (collected for the first stage of the process), and end-of-batch output quality Y1 is collected (or extracted from a data historian if desired). PLS modeling calculations or procedures are then performed on that training data set to produce a PLS batch model M1 of the first stage of the multi-stage batch process. The stage 1 PLS model M1 is then run with the initial condition data I1 and the process variable data X1 applied as inputs to the PLS model M1 to produce an end-of-batch quality prediction Yp1. The PLS model M1 may additionally provide an estimate of the reliability or accuracy of the prediction Yp1, such as a confidence interval CI1, or such an estimate of reliability or accuracy may be separately calculated as is well-known by those of ordinary skill in the art. The end-of-batch quality prediction Yp1 and/or confidence interval CI1 are then used as initial inputs in developing a PLS model M2 of stage 2 of the batch process as is illustrated in FIG. 14. In like fashion, once the PLS model M2 is created (using the quality prediction Yp1 and/or the confidence interval CI1 developed by the PLS model M1 of stage 1 as inputs along with stage 2 data X2 and the batch output quality measure Y), the PLS model M2 is then run with inputs including the initial condition data I2 and process variable data X2 for stage 2 of the batch process and also including the end-of-batch quality prediction Yp1 and the corresponding confidence interval CI1 output by the model M1 of stage 1 of the batch process (developed using the training data as inputs) to develop the end-of-batch quality prediction Yp2 and the corresponding confidence interval CI2 for the second stage of the model. This process is repeated for stage 3 using the end-of-batch quality prediction Yp2 and confidence interval CI2 from the model M2, and so on for each subsequent stage of the multi-stage batch process, as shown. Thus, each stage model is created using outputs of previous stages models including predictive and/or confidence outputs of the previous stage models, for example only. Of course, while FIG. 14 illustrates model development using the method (1) illustrated in on the right side of FIG. 12, the stage models M1, M2, M3, etc. could also be developed using the method (2) on the left side of FIG. 12, such that the first stage model M1 is developed using training data X1, X2, etc., from all subsequent stages of the process, that second stage model M2 is developed using training data X2, X3, X4, etc. from all subsequent stages of the process, and so on.

Figure 15:
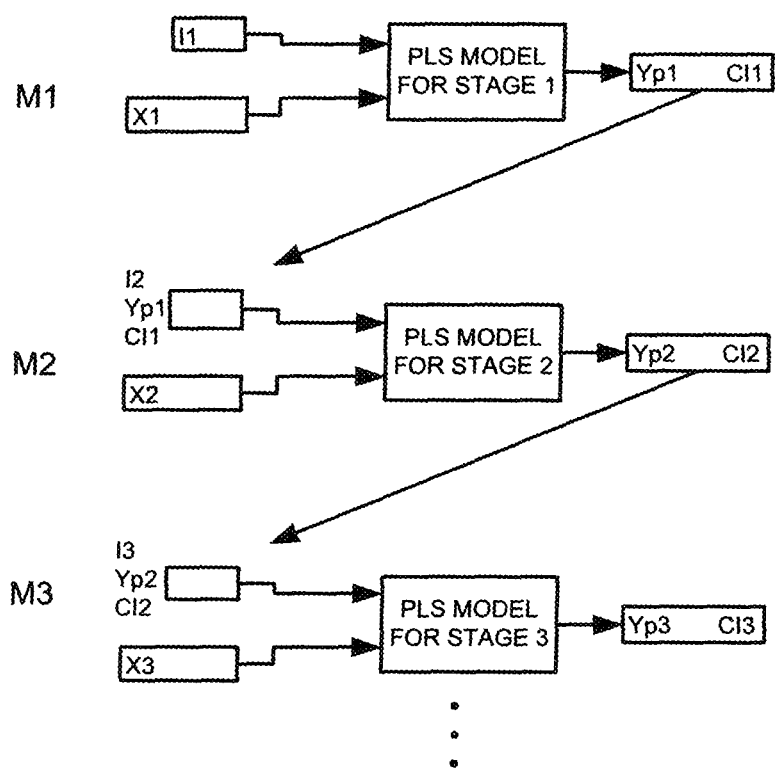
FIG. 15 is a diagram illustrating use of the PLS model developed as shown in FIG. 14.

Once the models M1, M2, . . . Mn for the n stages of the multi-stage batch process are developed as described above with reference to FIG. 14, the multi-stage model may be used to model the batch process in order to, for example, predict output quality for batches as they are produced, such as to make decisions about whether to continue or abort a run of the batch process or adjust inputs to subsequent stages to try to rectify any deficiency in end-of-batch product quality predicted by modeling earlier stages of the batch process. FIG. 15 illustrates an example use of the multi-stage batch process.

As illustrated in FIG. 15, initial condition data I1 and process variable data X1 as measured or obtained from an actual run of stage 1 of the batch process are applied to the PLS model M1 for stage 1. This data may be captured on line or may be obtained from a data historian if so desired. The running of the PLS model MI for stage 1 using this data produces an output quality prediction Yp1 and a corresponding confidence interval CI1. The output quality prediction Yp1 and confidence interval CI1 may then be used to estimate the final quality of the batch run based on the running of this stage of the batch and decision may be made as to continue to run the batch, halt the batch or make changes to the batch procedure at subsequent stages in order to increase the quality of the batch based on the actual running of the first stage of the batch.

Likewise, the outputs of the PLS model M1 may subsequently be applied as inputs to the PLS model M2 of stage 2, together with the initial condition data I2 and process variable data X2 measured from stage 2 of the batch after stage 2 of the batch is completed. The model M2 produces an end-of-batch quality prediction Yp2 and confidence interval CI2, which, in turn, are applied to the PLS model of the next successive stage of the batch process, and so on, until all stages of the multi-stage batch process have been modeled, with each model making use of the end-of-batch quality prediction and confidence interval generated by the PLS model of the previous stage.

Of course, the multi-stage model described herein may be run at any time during a batch run (e.g. while the batch is on line) such that all previous stages of the on-line batch run are used to predict the final output quality of the batch run at the current stage or operating point of the batch. Likewise, the multi-stage models as developed and run herein may be run after a batch is run to determine potential changes to a future run of the batch to obtain better quality at the output of the batch. Of course, the multi-stage modeling development and execution techniques as described herein may be used for any desired purpose in may situations and are applicable to batch as well as to continuous processes.

As noted above, at least some of the above described example methods and/or apparatus may be implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or systems described herein.

It should also be noted that the example software and/or firmware implementations described herein are stored on a tangible storage medium, such as a magnetic medium (e.g., a magnetic disk or tape), a magneto-optical or optical medium such as an optical disk, or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media. To the extent the above specification describes example components and functions with reference to particular standards and protocols, it is understood that the scope of this patent is not limited to such standards and protocols. For instance, each of the standards for internet and other packet-switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example methods and apparatus including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification describes example methods, systems, and/or machine-accessible medium, the examples are not the only way to implement such systems, methods and machine-accessible medium. Therefore, although certain example methods, systems, and machine-accessible medium have been described herein, the scope of coverage of this patent is not limited thereto.

What is claimed is:

1. A method of modeling a process, comprising:
sequentially developing, by one or more computer processors, a plurality of models, each of the plurality of models corresponding to a respective one of a plurality of process stages into which the process is resolved, said plurality of models including at least a first model of a first one of the plurality of process stages, wherein the first one of the plurality of process stages occurs before any other one of the plurality of process stages in the process, wherein sequentially developing the plurality of models includes:
developing the first model using first data from one or more runs of the first one of the plurality of process stages and first product quality data relating to the one or more runs of the first one of the plurality of process stages,
running the first model to generate a first output quality prediction and a first measure of reliability corresponding to the first model,
for each of the plurality of process stages after the first one of the plurality of process stages in an order of the plurality of process stages after the first one of the plurality of process stages:
developing a subsequent model using subsequent data from one or more runs of the process stage, subsequent product quality data relating to the one or more runs of the process stage, a previous output quality prediction, and a previous measure of reliability, wherein the previous output quality prediction and the previous measure of reliability are generated by running a previous model of a previous one of the plurality of process stages, and wherein the previous one of the plurality of process stages occurs, in the process, before the process stage, and
running the subsequent model of the process stage to generate a subsequent output quality prediction and a subsequent measure of reliability.

2. The method of claim 1, wherein each of the first product quality data relating to the one or more runs of the first one of the plurality of process stages and the subsequent product quality data relating to the one or more runs of the process stage comprises one of an end-of-stage product quality and an end-of-batch product quality.

3. The method of claim 1, wherein each of the plurality of models corresponding to the respective one of the plurality of process stages is adapted to produce a prediction of one of an end-of-stage product quality and an end-of-batch product quality.

4. The method of claim 1, wherein the process is a batch process, and wherein sequentially developing the plurality of models corresponding to the plurality of process stages comprises gathering the first data during the one or more runs of the first one of the plurality of process stages to produce a plurality of batches, and wherein gathering the first data includes measuring values for each of a plurality of process variables during the first one of the plurality of process stages of each of the one or more runs.

5. The method of claim 4, wherein the measured values for the first one of the plurality of process stages of each run of the process comprise a three-dimensional array of data including the measured values corresponding to the plurality of process variables during the first one of the plurality of process stages, and further comprising unfolding, by the one or more computer processors, the three-dimensional array of data into a two-dimensional array of data comprising the measured values of the plurality of process variables at each of a plurality of times during the first one of the plurality of process stages.

6. The method of claim 1, wherein the process is a batch process, and wherein the first output quality prediction produced by the first model comprises a quality prediction for a batch produced by the batch process.

7. The method of claim 1, wherein the process is a continuous process, and wherein sequentially developing each of the plurality of models corresponding to the respective one of the plurality of process stages comprises gathering, by the one or more computer processors, the first data from the one or more runs of the first one of the plurality of process stages during each of a plurality of time periods during implementation of the continuous process, and wherein gathering the first data includes measuring values for each of a plurality of process variables during each of the plurality of time periods.

8. The method of claim 7, wherein the measured values comprise a three-dimensional array of data including the measured values corresponding to each of the plurality of process variables during the first one of the plurality of process stages for each of the plurality of time periods, and further comprising unfolding, by the one or more computer processors, the three-dimensional array of data into a two-dimensional array of data comprising the measured values of the plurality of process variables at each of the plurality of time periods during each of the one or more runs.

9. The method of claim 1, wherein the first output quality prediction produced by the first model of the first process stage is used as initial conditions for the second model of the second process stage.

10. The method of claim 1, wherein sequentially developing each of the plurality of models comprises constructing a projection to latent structures (PLS) model of the respective one of the plurality of process stages.

11. The method of claim 1, wherein, when used to develop the subsequent model, a forgetting factor is applied to the previous output quality prediction produced by the previous model, wherein the forgetting factor reduces the influence of the previous output quality prediction produced by the previous model on other predictions produced by other of the plurality of models.

12. A method of analyzing a batch produced by a process, comprising:
sequentially developing, by a workstation coupled to a process controller, a plurality of models, each of the plurality of models corresponding to a respective one of a plurality of process stages into which the process is resolved, said plurality of models including at least a first model of a first one of the plurality of process stages and a second model of a second one of the plurality of process stages, wherein the first one of the plurality of process stages occurs before any other one of the plurality of process stages in the process, and wherein sequentially developing the plurality of models includes:
developing the first model using data from one or more runs of the first one of the plurality of process stages, running the first model to generate first information and a first measure of reliability corresponding to the first model, and developing the second model of the second one of the plurality of process stages using the first information and the first measure of reliability generated by the first model of the first one of the plurality of process stages, the first measure of reliability representing an accuracy of an output quality prediction; and using, by the workstation coupled to a process controller, the plurality of models to predict a value of a parameter of the process.

13. The method of claim 12, wherein the first information generated by the first model of the first one of the plurality of process stages includes an output quality prediction for the first one of the plurality of process stages.

14. The method of claim 13, wherein the first measure of reliability is a confidence interval associated with the output quality prediction for the first one of the plurality of process stages.

15. The method of claim 12, wherein at least one of the first model of the first one of the plurality of process stages and the second model of the second one of the plurality of process stages is a PLS model.

16. A computer-based method of analyzing a batch produced by a process, comprising:

sequentially developing, by one or more computer processors, a plurality of models, each of the plurality of models corresponding to a respective one of a plurality of process stages into which the process is resolved, said plurality of models including at least a first model of a first one of the plurality of process stages and a second model of a second one of the plurality of process stages, wherein sequentially developing the plurality of models includes:

developing the first model using data from one or more runs of the first one of the plurality of process stages, running the first model to generate first information and a first measure of reliability corresponding to the first model, and developing the second model of the second one of the plurality of process stages using the first information and the first measure of reliability generated by the first model of the first one of the plurality of process stages, the first measure of reliability representing an accuracy of an output quality prediction; and using, by the one or more computer processors, the plurality of models to predict a value of a parameter of the process.

17. The computer-based method of claim 16, wherein the first information generated by the first model of the first one of the plurality of process stages includes an output quality prediction for the first one of the plurality of process stages.

18. The computer-based method of claim 16, wherein at least one of the first model of the one of the plurality of process stages and the second model of the second one of the plurality of process stages is a PLS model.

19. A non-transitory computer-readable medium having stored thereon machine-executable instructions for modeling a process, wherein the process is resolvable into a plurality of process stages including at least a first process stage and a second process stage, the machine-executable instructions, when executed by one or more processors, cause the one or more processors to:

sequentially develop a plurality of models, each of the plurality of models corresponding to a respective one of the plurality of process stages, said plurality of models including at least a first model of a first process stage, wherein the first process stage occurs before any other one of the plurality of process stages in the process, and wherein sequentially developing the plurality of models includes:

developing the first model using first data from one or more runs of the first process stage and first product quality data relating to the one or more runs of the first process stage, running the first model to generate a first output quality prediction and a first measure of reliability corresponding to the first model, for each of the plurality of process stages after the first process stage in an order of the plurality of process stages after the first process stage:

developing a subsequent model using subsequent data from one or more runs of the process stage, subsequent product quality data relating to the one or more runs of the process stage, a previous output quality prediction, and a previous measure of reliability, wherein the previous output quality prediction and the previous measure of reliability are generated by running a previous model of a previous one of the plurality of process stages, and wherein the previous one of the plurality of process stages occurs, in the process, before the process stage, and running the subsequent model of the process stage to generate a subsequent output quality prediction and a subsequent measure of reliability.

20. The non-transitory computer-readable medium of claim 19, wherein the subsequent product quality data relating to the one or more runs of the process stage comprises one of an end-of-stage product quality and an end-of-batch product quality.

21. The non-transitory computer-readable medium of claim 19, wherein the each of the plurality of models produces one of an end-of-stage product quality and an end-of-batch product quality.

22. The non-transitory computer-readable medium of claim 19, wherein the process is a batch process, and wherein the subsequent data gathered during the one or more runs is gathered during the one or more runs of the process stage to produce a plurality of batches, and wherein the subsequent data gathered during the one or more runs includes measured values for each of a plurality of process variables during the process stage of each of the one or more runs.

23. The non-transitory computer-readable medium of claim 22, wherein the measured values comprise a three-dimensional array of data including the measured values for each of the plurality of process variables during the process stage for each of the plurality of batches, and wherein the instructions further cause the one or more processors to unfold the three-dimensional array of data into a two-dimensional array of data comprising the measured values of the plurality of process variables at each of a plurality of times during the process stage.

24. The non-transitory computer-readable medium of claim 19, wherein the process is a batch process, and wherein the subsequent output quality prediction produced by the subsequent model of the process stage comprises a quality prediction for a batch produced by the batch process.

25. The non-transitory computer-readable medium of claim 19, wherein the process is a continuous process, and wherein the subsequent data gathered during the one or more runs of the process stage is gathered at each of a plurality of time periods during implementation of the continuous process, and wherein the subsequent data gathered at each of the plurality of time periods includes measured values for each of a plurality of process variables.

26. The non-transitory computer-readable medium of claim 25, wherein the measured values comprise a three-dimensional array of data including the measured values for each of the plurality of process variables during the process stage for each of the plurality of time periods during implementation of the continuous process, and wherein the instructions further cause the one or more processors to unfold the three-dimensional array of data into a two-dimensional array of data comprising the measured values of the plurality of process variables at each of the plurality of times periods during implementation of the continuous process.

27. The non-transitory computer-readable medium of claim 19, wherein the first output quality prediction produced by the first model for the first process stage is utilized as initial conditions for the subsequent model corresponding to one of the plurality of process stages occurring, in the process, directly after the first process stage.

28. The non-transitory computer-readable medium of claim 19, wherein at least one of the plurality of models is a projection to latent structures (PLS) model of the respective one of the process stages.

29. The non-transitory computer-readable medium of claim 19, wherein the subsequent model is developed using the previous output quality prediction produced by the previous model including applying a forgetting factor to the previous output quality prediction produced by the previous model, the forgetting factor reducing the influence of the previous output quality prediction produced by the previous model on other predictions produced by other of the plurality of models.

30. A non-transitory computer-readable medium having machine-executable instructions stored thereon for analyzing a batch produced by a process, wherein he process is resolvable into a plurality of process stages including at least a first process stage and a second process stage, the machine-executable instructions, when executed by one or more processors, cause the one or more processors to:
    sequentially develop a plurality of models, each of the plurality of models corresponding to a respective one of the plurality of process stages, said plurality of models including at least a first model of the first process stage and a second model of the second process stage, wherein sequentially developing the plurality of models includes:
        developing the first model using data from one or more runs of the first process stage,
        running the first model to generate first information and a first measure of reliability corresponding to the first model, and
        developing the second model of the second one of the plurality of process stages using the first information and the first measure of reliability generated by the first model of the first process stage, the first measure of reliability representing an accuracy of the output quality prediction; and
    utilize the plurality of models to predict a value of a parameter of the process.

31. The non-transitory computer-readable medium of claim 30, wherein the first information generated by the first model of the first process stage includes an output quality prediction for the first process stage.

32. The non-transitory computer-readable medium of claim 30, wherein the first measure of reliability is a confidence interval associated with the first output quality prediction for the first process stage.

33. The non-transitory computer-readable medium of claim 30, wherein at least one of the first model of the first process stage and the second model of the second process stage is a PLS model.

34. A method of modeling a process having a first process stage occurring, in the process, before a second process stage, comprising:
    developing, by one or more computer processors, a first model of the first process stage using a training data set corresponding to a plurality of runs of the process;
    running, by the one or more computer processors, the first model with at least a first portion of the training data set as input to produce an output quality prediction and a measure of reliability corresponding to the output quality prediction for the first process stage, the measure of reliability representing an accuracy of the output quality prediction;
    after developing the first model, developing, by the one or more computer processors, a second model of the second process stage using at least a second portion of the training data set, the output quality prediction produced by the first model, and the measure of reliability produced by the first model and corresponding to the output quality prediction for the first process stage.

35. The method of claim 34, wherein the process is resolvable into a plurality of stages including the first process stage and the second process stage, the method further comprising:
    sequentially developing, by the one or more computer processors, a respective model of each of the plurality of process stages occurring, in the process, after the first process stage and the second process stage, wherein sequentially developing the respective model for each of the plurality of process stages occurring, in the process, after the first process stage and the second process stage includes developing the respective model such that the respective model produces a respective output quality prediction for the corresponding one of the plurality of process stages based on at least a portion of the training data set and based on a preceding output quality prediction of a preceding one of the plurality of process stages.

36. The method of claim 34, wherein at least one of the first model of the first process stage and second model of the second process stage is a projection to latent structures (PLS) model.

37. The method of claim 34, wherein the process is one of a batch process and a continuous process.

38. A method of using a model of a multi-stage process having a first process stage and a second process stage, wherein the model includes a first model of the first process stage and a second model of the second process stage, the method comprising:
    producing, by one or more computer processors, a first output quality prediction for the first process stage using the first model of the first process stage, wherein the first model generates the first output quality prediction based on a first set of data obtained from a first run the multi-stage process;
    producing, by the one or more processors, a measure of reliability using the first model of the first process stage, the measure of reliability corresponding to the first output quality prediction and the measure of reliability representing an accuracy of the first output quality prediction; and
    producing, by the one or more computer processors, a second output quality prediction for the second process stage using the second model of the second process stage, wherein the second model generates the second output quality prediction based on a second set of data obtained from a second run of the multi-stage process, the first output quality prediction for the first process stage, and the measure of reliability.

39. The method of claim 38, wherein the measure of reliability is a confidence interval associated with the first output quality prediction for the first process stage.

40. The method of claim 38, wherein at least one of the first model of the first process stage and the second model of the second process stage is a PLS model.

41. A non-transitory computer-readable medium having stored thereon machine-executable instructions for modeling a process having a first process stage occurring, in the process, before a second process stage, the machine-executable instructions, when executed by one or more processors, cause the one or more processors to:
  develop a first model of the first process stage using a training data set corresponding to a plurality of runs of the process, the first model adapted to produce:
    (i) a first output quality prediction for the first process stage when at least a first portion of the training data set is input to the first model of the first process stage, and
    (ii) a measure of reliability corresponding to the first output quality prediction, wherein the measure of reliability represents an accuracy of the output quality prediction;
  run the first model to produce the first output quality predication and the measure of reliability; and
  after developing and running the first model, develop a second model of the second process stage using the training data set corresponding to the plurality of runs of the process, the second model adapted to produce a second output quality prediction for the second process stage when at least a second portion of the training data set, the first output quality prediction for the first process stage, and the measure of reliability are input to the second model of the second process stage.

42. The computer-based model of claim 41, wherein the machine-executable instructions further cause the one or more processors to develop one or more models corresponding to one or more other process stages following the first process stage and the second process stage, wherein each of the one or more models receives as input at least a portion of the training data set and a preceding output quality prediction of the preceding one of the one or more process stages, the second process stage, or the first process stage.

43. The computer-based model of claim 41, wherein at least one of the first model of the first process stage and the second model of the second process stages is a principal component analysis (PCA) model.

44. The computer-based model of claim 41, wherein the process is one of a batch process and a continuous process.

45. The method of claim 38, wherein developing the first model includes developing the first model using a first set of data in the training data and developing the second model includes developing the second model using a second set of data in the training data, wherein the first set of data corresponds to first process variable data obtained during the first process stage of a run of the multi-stage process, and wherein the second set of data corresponds to second process variable data obtained during the second process stage of the run of the multi-stage process.

46. The method of claim 38, wherein the measure of reliability of the first output quality prediction for the first process stage is a confidence interval for the first output quality prediction for the first process stage.

47. A non-transitory computer-readable medium having stored thereon machine-executable instructions for modeling a process having a first process stage and a second process stage, the machine-executable instructions, when executed by one or more processors, cause the one or more processors to:
  develop a first model of the first process stage using a training data set corresponding to a plurality of runs of the process;
  produce a first output quality prediction for the first process stage by running the first model, wherein the first model generates the first output quality prediction based on a first portion of the training data set;
  produce a measure of reliability by running the first model of the first process stage, the measure of reliability corresponding to the first output quality prediction and the measure of reliability representing an accuracy of the first output quality prediction; and
  after developing the first model, develop a second model of the second process stage using at least a second portion of the training data set, the first output quality prediction for the first process stage, and the measure of reliability.

48. The non-transitory computer-readable medium of claim 47, wherein the machine-executable instructions further cause the one or more processors to:
  develop a plurality of models of each of a plurality of process stages of the process other than the first process stage and the second process stage,
  produce a respective output quality prediction for each of the plurality of process stages with the plurality of models, wherein at least a portion of the training data set and a preceding output quality prediction corresponding to a preceding one of the plurality of models, the first model, or the second model are provided to each of the plurality of models as input.

49. The non-transitory computer-readable medium of claim 47, wherein at least one of the first model of the first process stage and the second model of the second process stage is a projection to latent structures (PLS) model.

50. The non-transitory computer-readable medium of claim 47, wherein the process is one of a batch process and a continuous process.

51. The non-transitory computer-readable medium of claim 47, wherein the machine-executable instruction further cause the one or more processors to:
  produce a first online output quality prediction for the first process stage with the first model, wherein the first model generates the first online output quality prediction based on a first set of data obtained from a first run the multi-stage process; and
  produce a second online output quality prediction for the second process stage with the second model, wherein the second model generates the second online output quality prediction based on a second set of data obtained from a second run of the multi-stage process and the first online output quality prediction for the first process stage.

52. A computer device comprising:
  one or more processors; and
  one or more non-transitory memories coupled to the one or more processors,
  wherein the one or more non-transitory memories include computer executable instructions stored therein that, when executed by the one or more processors, cause the one or more processors to
  sequentially develop a plurality of models, each of the plurality of models corresponding to a respective one of a plurality of process stages into which a process is resolved, said plurality of models including at least a first model of a first one of the plurality of process stages and a second model of a second one of the plurality of process stages, wherein the first one of the plurality of process stages occurs before any other one of the plurality of process stages in the process, and wherein sequentially developing the plurality of models includes:

developing the first model, running the first model to generate a first information and a measure of reliability, the measure of reliability representing an accuracy of the first information, and developing the second model of the second one of the plurality of process stages using the first information generated by the first model of the first one of the plurality of process stages and the measure of reliability generated by the first model of the first one of the plurality of process stages to generate second information; and utilize the plurality of models to predict a value of a parameter of the process.

53. A process control system comprising:

one or more field devices;

a process controller configured to control the one or more field devices; and a workstation coupled to the process controller, the workstation configured to develop a first model of the first process stage using a training data set corresponding to a plurality of runs of the process;

produce a first output quality prediction for the first process stage by running the first model, wherein the first model generates the first output quality prediction based on a first portion of the training data set;

produce a measure of reliability by running the first model of the first process stage, the measure of reliability corresponding to the first output quality prediction and the measure of reliability representing an accuracy of the first output quality prediction; and after developing the first model, develop a second model of the second process stage using at least a second portion of the training data set, the first output quality prediction for the first process stage, and the measure of reliability.

* * * * *